United States Patent
Igashira et al.

(10) Patent No.: US 8,225,136 B2
(45) Date of Patent: Jul. 17, 2012

(54) CONTROL METHOD AND STORAGE DEVICE

(75) Inventors: Atsushi Igashira, Kawasaki (JP); Hideo Takahashi, Kawasaki (JP); Yoshihito Konta, Kawasaki (JP); Norihide Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 622 days.

(21) Appl. No.: 12/480,851

(22) Filed: Jun. 9, 2009

(65) Prior Publication Data

US 2009/0313498 A1 Dec. 17, 2009

(30) Foreign Application Priority Data

Jun. 13, 2008 (JP) .................. 2008-154768

(51) Int. Cl.
*G06F 11/10* (2006.01)
(52) U.S. Cl. .................. 714/6.22; 711/114
(58) Field of Classification Search .......... 711/114; 714/6.22, 770
See application file for complete search history.

(56) References Cited

U.S. PATENT DOCUMENTS

| | | | | |
|---|---|---|---|---|
| 5,301,297 A * | 4/1994 | Menon et al. | .................. | 711/114 |
| 5,313,585 A * | 5/1994 | Jeffries et al. | .................. | 711/201 |
| 5,390,327 A * | 2/1995 | Lubbers et al. | .............. | 714/6.32 |
| 5,504,858 A * | 4/1996 | Ellis et al. | .................... | 714/6.24 |
| 5,598,549 A * | 1/1997 | Rathunde | .................... | 711/114 |
| 5,708,668 A * | 1/1998 | Styczinski | .................... | 714/6.21 |
| 5,720,025 A * | 2/1998 | Wilkes et al. | .................. | 714/6.12 |
| 5,742,752 A * | 4/1998 | DeKoning | .................. | 714/6.22 |
| 5,774,643 A * | 6/1998 | Lubbers et al. | .................. | 714/20 |
| 5,805,788 A * | 9/1998 | Johnson | ........................ | 714/6.12 |
| 5,822,584 A * | 10/1998 | Thompson et al. | ............ | 718/103 |
| 6,067,635 A * | 5/2000 | DeKoning et al. | ........... | 714/6.21 |
| 6,151,641 A * | 11/2000 | Herbert | ............................ | 710/22 |
| 6,233,696 B1 * | 5/2001 | Kedem | .......................... | 714/6.23 |
| 6,665,773 B1 * | 12/2003 | McCombs | ..................... | 711/114 |
| 6,725,392 B1 * | 4/2004 | Frey et al. | ..................... | 714/6.12 |
| 7,305,579 B2 * | 12/2007 | Williams | ..................... | 714/6.32 |
| 7,392,458 B2 * | 6/2008 | Forhan et al. | .................. | 714/770 |
| 7,644,303 B2 * | 1/2010 | Byrne et al. | .................. | 714/6.11 |
| 7,752,489 B2 * | 7/2010 | Deenadhayalan et al. | ... | 714/6.12 |
| 7,779,335 B2 * | 8/2010 | Forhan et al. | ................. | 714/770 |
| 7,809,979 B2 * | 10/2010 | Mochizuki et al. | ......... | 714/38.14 |
| 2006/0206752 A1 | 9/2006 | Ikeuchi et al. | | |

FOREIGN PATENT DOCUMENTS

JP 2003-167688 6/2003
JP 2006-252414 9/2006
* cited by examiner

*Primary Examiner* — Stephen Baker
(74) *Attorney, Agent, or Firm* — Staas & Halsey LLP

(57) ABSTRACT

A control method includes the steps of storing data in a cache; generating parity data corresponding to the data stored in the cache and storing the parity data in a buffer; writing the data stored in the cache and the parity data stored in the buffer into a plurality of the storage units; reading the data and the parity data from the plurality of storage units; checking error over the read out data by using the read out parity data; storing, if an error is detected in the read out data and the read out parity data, data for reading a plurality of data constituting a stripe in each of the plurality of storage units in the buffer, regenerating parity data by using the plurality of data readout from the storage units; and overwriting the plurality of data and the parity data into the plurality of the storage units.

4 Claims, 23 Drawing Sheets

| | 201 | 202 | 203 | 204 | |
|---|---|---|---|---|---|
| Pre | Old Data 109 | Old Data 205 | Old Data 206 | Old Parity 110 | CONSISTENCY: ○ |
| After | New Data 108 | Old Data 205 | Old Data 206 | Old Parity 110 | CONSISTENCY: × |

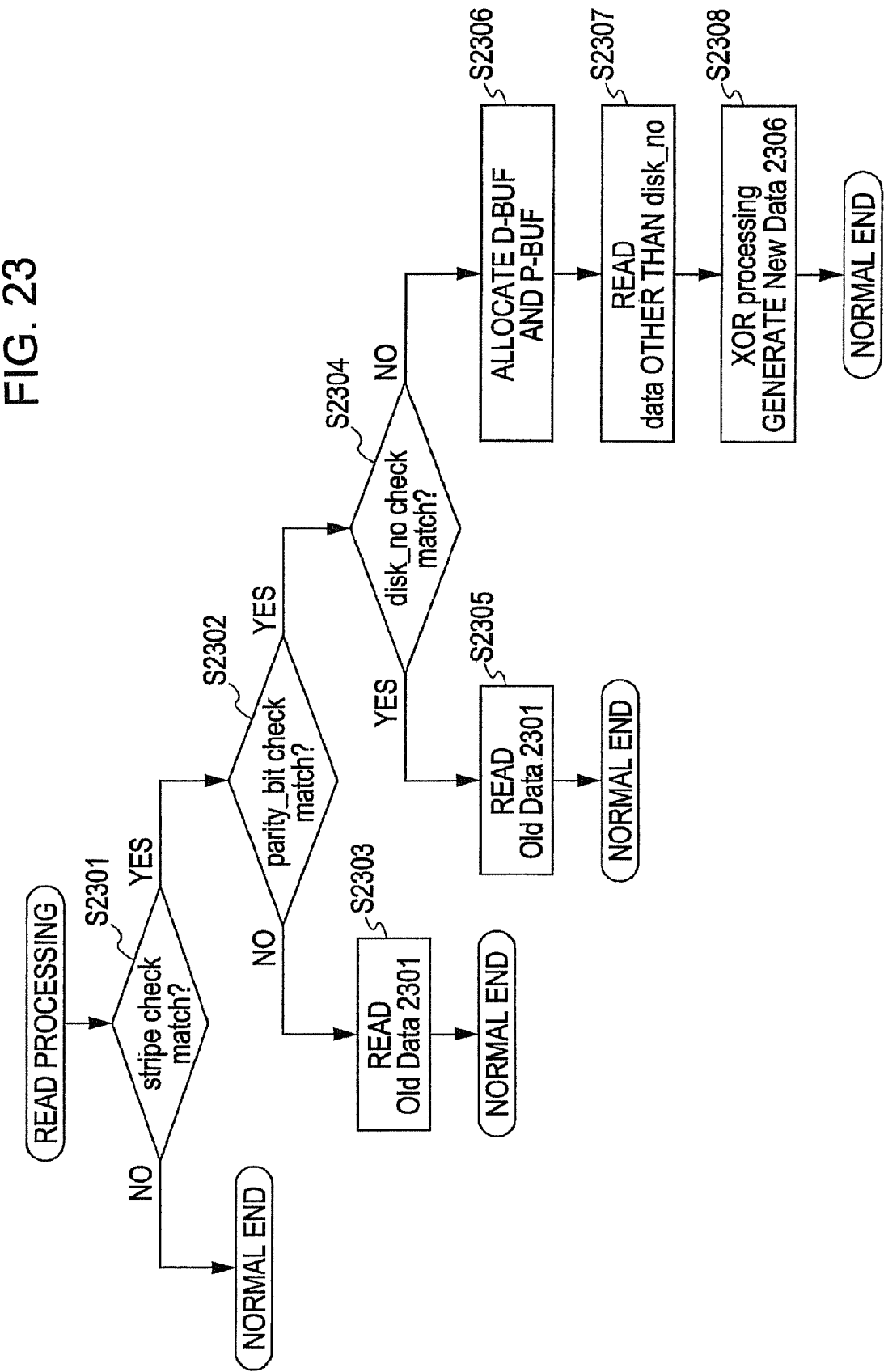

CONTROL METHOD AND STORAGE DEVICE

CROSS-REFERENCE TO RELATED APPLICATION

This application is based upon and claims the benefit of priority of the prior Japanese Patent Application No. 2008-154768, filed on Jun. 13, 2008, the entire contents of which are incorporated herein by reference.

FIELD

A certain aspect of the embodiments discussed herein is related to a technique of controlling of writing data to a storage device.

BACKGROUND

The RAID (redundant Arrays of Inexpensive (Independent) Disks) is a typical storage device. The RAID stores data in a redundant form to thereby enable a high-reliable storage device. The RAID 5 and the RAID 6 have been often used.

However, a RAID system configured using the RAID 5, the RAID 6, or the like involves a problem that would occur in the case where a RAID controller that controls operations of reading/writing data from/to a storage device successfully writes data to a disk but fails to write parity data corresponding to the data to the disk. In such a case, the RAID controller retains the parity data until the RAID controller successfully retries to write the parity data to the disk. This is to keep redundant structure of the data. On the other hand, resources of the parity buffer are limited.

Thus, if the RAID controller receives a new write command from a host computer or accepts high-load write processing without any interval with the parity data being stored in the parity buffer, a capacity of the parity buffer runs short, resulting in a problem that the RAID controller sends an error response to the host computer (JOB ABEND).

Techniques regarding RAID are disclosed in, for example, Japanese Laid-Open Patent Application Publication Nos. 2006-252414 and 2003-167688.

SUMMARY

According to an aspect of an embodiment, a control method for controlling a controller connected to a plurality of storage units storing data, the controller including a cache and a buffer including: storing data in the cache; generating parity data corresponding to the data stored in the cache and storing the parity data in the buffer; writing the data stored in the cache and the parity data stored in the buffer into the plurality of the storage units; reading the data and the parity data from the plurality of storage units; checking error over the read out data by using the read out parity data; storing, if an error is detected in the read out data and the read out parity data, data for reading a plurality of data constituting a stripe in each of the plurality of storage units in the buffer, regenerating parity data by using the plurality of data readout from the storage units; and overwriting the plurality of data and the parity data into the plurality of the storage units.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 2 shows a data table according to the embodiment of the present invention;

FIG. 23 is a flowchart of processing for reading data (Old Data) stored in a disk according to the embodiment of the present invention.

DESCRIPTION OF THE EMBODIMENTS

Hereinafter, a RAID system as one example of storage devices will be described.

First Embodiment

[1. RAID system 100]

Figure 1:
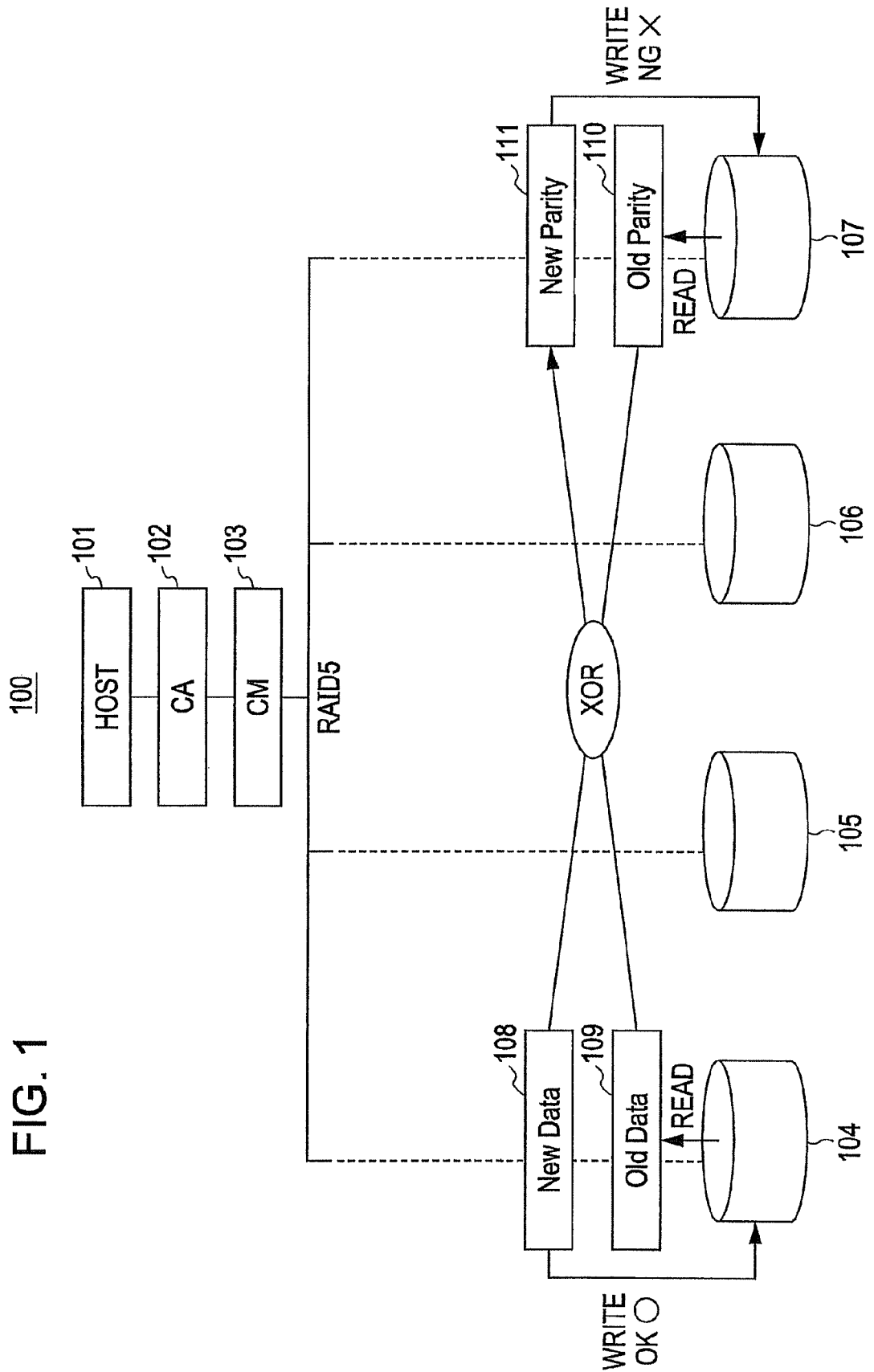
FIG. 1 is a diagram of a RAID system according to an embodiment of the present invention.

FIG. 1 is a diagram of a RAID system according to a first embodiment of the present invention. A RAID level of the RAID system 100 is RAID 5. The RAID system 100 of this embodiment has a so-called (3+1) configuration of RAID 5. The RAID system 100 includes a host computer 101, a CA (channel adaptor) 102, a CM (controller module) 103, and disks 104, 105, 106, and 107. Since the RAID system 100 conforms to RAID 5, each data stripe is composed of three data stripes and one parity stripe.

[1.1. Host computer 101]

The host computer 101 sends a write command and a read command to the CA 102. The host computer 101 sends data to be written to the disks 104 to 107 together with the write command to the CA 102.

[1.2. CA (channel adaptor) 102]

The CA 102 controls communications between the host computer 101 and the CM 103. The CA 102 processes a write command or read command sent from the host computer 101 to write/read data to/from the CM 103, and controls data transfer between the host computer 101 and the CM 103.

[1.3. CM (controller module) 103]

The CM 103 stores data received from the host computer 101 through the CA 102 with the data being distributed to the disks 104 to 107. This embodiment is described on the assumption that the CM 103 writes data (New Data) 108 to the disk 104 and updates parity data (Old Parity) 110 to parity data (New Parity) 111.

Upon writing the data (New Data) 108 to the disk 104, the CM 103 first reads data (Old Data) 109 from the disk 104.

Then, the CM 103 reads the parity data (Old Parity) 110 corresponding to the data (Old Data) 109 from the disk 107. The parity data (Old Parity) 110 is exclusive OR of the data (Old Data) 109 and data (data 205 and 206 in FIG. 2) stored in the disks 105 and 106 and corresponding to the data 109.

The CM 103 performs exclusive OR of the data (New Data) 108, the data (Old Data) 109, and the data (Old Parity) 110 to generate data (New Parity) 111. The CM 103 tries to write the data (New Data) 108 and the data (New Parity) 109 to the disk 104 and the disk 107, respectively.

If the CM 103 successfully wrote the data (New Data) 108 to the disk 104 and failed to write the parity data (New Parity) 111 to the disk 107, there arises a problem of inconsistency between the data stored in the disks 104 to 107.

FIG. 2 shows a data table 200 summarizing data stored in the disks 104 to 107 of this embodiment. The data table 200 shows data stored in the disks 104 to 107 before and after the data (New Data) 108 is written to the disk 104. Each of the data in the data table 200 is data corresponding to one stripe stored in each of the disks 104 to 107. The disks 104 to 107 store data other than the data in the data table 200. A column 201 shows data stored in the disk 104, a column 202 shows data stored in the disk 105, a column 203 shows data stored in the disk 106, and a column 204 shows data stored in the disk 107.

Before the CM 103 writes data to the disks 104 and 107 (Pre), the disk 104 stores the data (Old Data) 109, the disk 105 stores the data (Old Data) 205, the disk 106 stores the data (Old Data) 206, and the disk 107 stores the parity data (Old Parity) 110.

Then, after the CM 103 wrote the data (New Data) 108 to the disk 104 (After), the disk 104 stores the data (New Data) 108, the disk 105 stores the data (Old Data) 205, the disk 106 stores the data (Old Data) 206, and the disk 107 stores the parity data (Old Parity) 110.

In this embodiment, the CM 103 fails to write the parity data (New Parity) 111 to the disk 107. Thus, after the CM 103 wrote the data (New Data) 108 to the disk 104 (After), the data stored in the disks 104 to 107 are inconsistency with one another.

If the CM 103 failed to write the parity data (Old Parity) 110 to the disk 107, the CM 103 saves the parity data (New Parity) 111 that could not be written, in a parity buffer. If the CM 103 further tries to write data to the disks 104 to 107 in response to a write command from the host computer 101 with the parity data 111 being retained in the parity buffer, there arises a problem of running out of a capacity of the parity buffer of the CM 103.

[1.3.1. Control to Prevent Buffer Capacity Exhaustion]

To overcome the above problem of running out of the capacity, the CM 103 performs the following processing to prevent exhaustion of the capacity of the parity buffer in the CM 103.

The CM 103 writes the parity data (New Parity) 111 that could not be written, to another disk. In this embodiment, the CM 103 writes the parity data (New Parity) 111 to the disk 106. After the CM 103 wrote the parity data (New Parity) 111 to the disk 106, the CM deallocates a parity buffer 312. Then, the CM 103 disconnects the disk 107, to which the parity data (New Parity) 111 could not be written, from the CM 103. To disconnect the disk 107 means to break electrical connection between the CM 103 and the disk 107.

If it becomes possible to write the parity data (New Parity) 111 to the disk 107 (the disk 107 recovers), the CM 103 executes rebuild processing. The CM 103 allocates a buffer on the memory and then reads the data (Old Data) 205 from the disk 105 to the buffer and reads the parity data (New Parity) 206 from the disk 106 to the buffer. The CM 103 writes the parity data (New Parity) 206 read from the disk 106 to the disk 107.

The CM 103 performs exclusive OR (XOR) of the data (New Data) 108, the data (Old Data) 205, and the parity data (New Parity) 111 to generate data (Old Data) 206. Here, the data (Old Data) 206 is the data stored in the disk 106, which is overwritten to the parity data (New Parity) 111 with the CM 103. The CM 103 writes the generated data (Old Data) 206 to the disk 106. The CM 103 deallocates the buffer.

This processing makes it possible to prevent exhaustion of a buffer capacity, which would occur in the case where the CM 103 could not write the parity data (New Parity) 111 to the disk 107.

Figure 3:
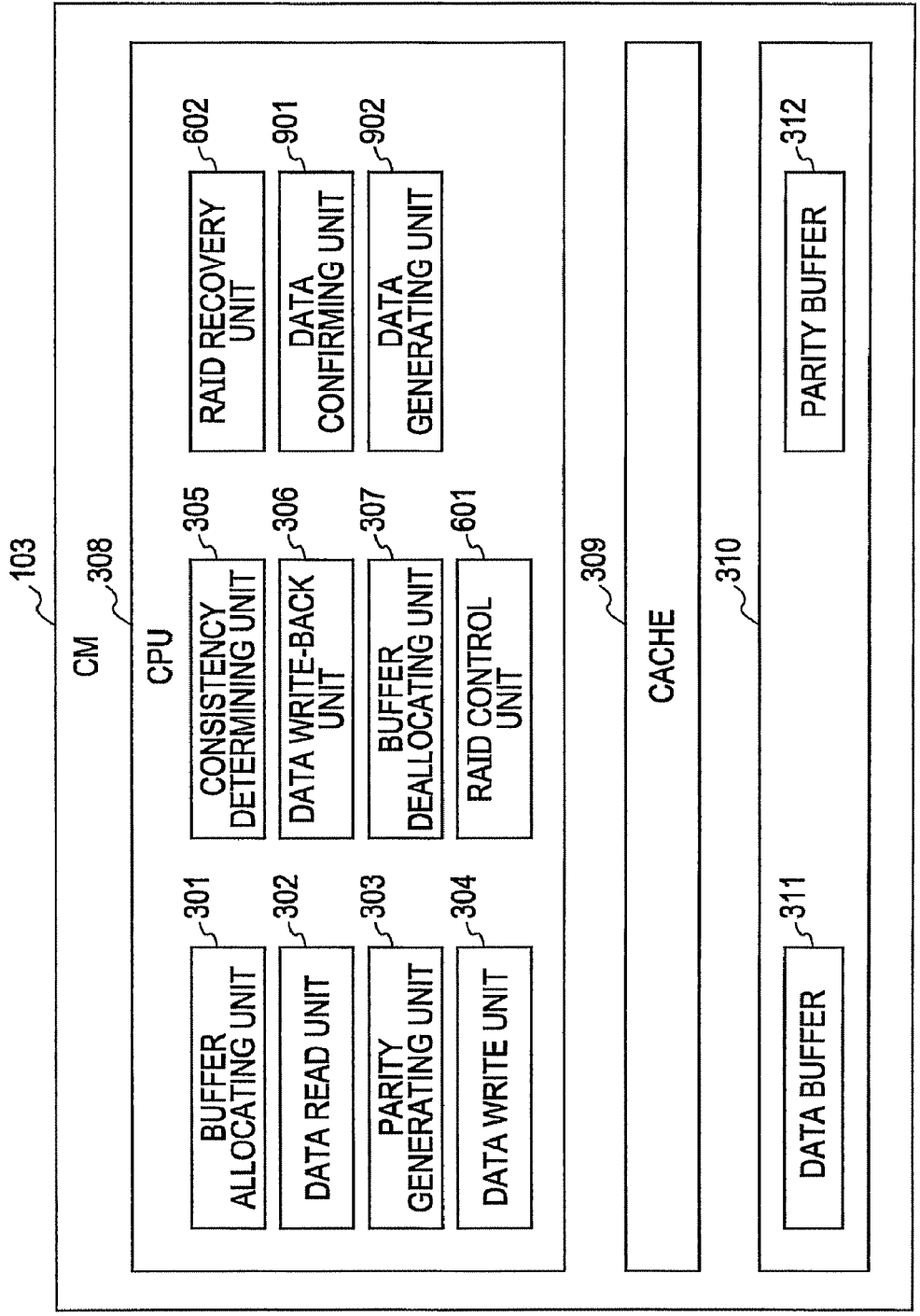
FIG. 3 is a functional block diagram of a CM according to the embodiment of the present invention.

FIG. 3 is a functional block diagram of the CM 103 of this embodiment.

The CM 103 includes a buffer allocating unit 301, a data read unit 302, a parity generating unit 303, a data write unit 304, a consistency determining unit 305, a data write-back unit 306, a buffer deallocating unit 307, a RAID control unit 601, a RAID recovery unit 602, a data validating unit 901, and a data generating unit 902. Further, the hard configuration of the CM 103 includes a CPU 308, a cache 309, and a memory 310. The CPU 308 executes the buffer allocating unit 301, the data read unit 302, the parity generating unit 303, the data write unit 304, the consistency determining unit 305, the data write-back unit 306, the buffer deallocating unit 307, the RAID control unit 601, the RAID recovery unit 602, the data validating unit 901, and the data generating unit 902. The CPU 308 executes these functions of the CM 103 to control operations of writing/reading data and parity data corresponding to the data to/from the cache 309 and the memory 310. Hereinafter, each function of the CM 103 will be described.

[2.1. Buffer Allocating Unit 301]

The CPU 308 executes the buffer allocating unit 301 to allocate a data buffer 311 and a parity buffer 312 on the memory 310. If the host computer 101 issues a small write (Small Write) data write command, the buffer allocating unit 301 allocates the data buffer 311 and the parity buffer 312 to which the data (Old Data) 109 and the data (Old Parity) 110 are to be read, on the memory 310. More specifically, the buffer allocating unit 301 executes processing for allocating an area enough to store the data (Old Data) 109 and the data (Old Parity) 110, within a predetermined address range in the memory 310.

The data buffer 311 allocated on the memory 310 with the buffer allocating unit 301 has a capacity barely enough to store the data (Old Data) 109 and equal to or equivalent to a size of the data (Old Data) 109. Likewise, the parity buffer 312 allocated on the memory 310 with the buffer allocating unit 301 has a capacity barely enough to store the parity data (Old Parity) 110 and equal to or equivalent to a size of the parity data (Old Parity) 110. This is because a rate of error that causes capacity exhaustion of the data buffer 311 and the parity buffer 312 is low. In other words, capacities of the data buffer 311 and parity buffer 312 are determined in consideration of an error rate and a memory capacity necessary for write processing. Thus, the buffer allocating unit 301 allocates the data buffer 311 and the parity buffer 312 in accordance with a predetermined error rate and a memory capacity necessary for write processing.

Further, the small write (Small Write) refers to write processing following the condition that a write range is a block (0xC0 block or less), which is not larger than ½ of one stripe, in the RAID system 100.

[2.2. Data Read Unit 302]

The CPU 308 executes the data read unit 302 to read the data (Old Data) 109 to the data buffer 311 and read the parity data (Old Parity) 110 to the parity buffer 312. After the buffer allocating unit 301 allocated the data buffer 311 and the parity buffer 312 on the memory 310, the data read unit 302 reads the data (Old Data) 109 to the data buffer 311 and reads the parity data (Old Parity) 110 to the parity buffer 312. The data read unit 302 stores the data (Old Data) 109 and the parity data (Old Parity) 110 in the data buffer 311 and the parity buffer 312, respectively.

[2.3. Parity Generating Unit 303]

The CPU 308 executes the parity generating unit 303 to generate the parity data (New Parity) 111. First, the parity generating unit 303 performs exclusive OR (XOR) of the data (Old Data) 109 in the data buffer 311 and the parity data (Old Parity) 110 in the parity buffer 312 to obtain an intermediate result. The parity generating unit 303 temporarily stores the intermediate result in the parity buffer 312 and deletes the parity data (Old Parity) 110 from the parity buffer 312. Then, the parity generating unit 303 performs exclusive OR (XOR) of the intermediate result and the data (New Data) 108 in the cache 309 to generate parity data (New Parity) 111. The parity generating unit 303 stores the parity data (New Parity) 111 in the parity buffer 312 and deletes the intermediate result from the parity buffer 312.

[2.4. Data Write Unit 304]

The CPU 308 executes the data write unit 304 and tries to write the data (New Data) 108 and the parity data (New Parity) 111 to the disk 104 and the disk 107, respectively. If the data write unit 304 can normally execute the write processing, the data (New Data) 108 and the parity data (New Parity) 111 can be written to the disk 104 and the disk 107, respectively.

In some cases, however, the data write unit 304 cannot write the parity data (New Parity) 111 to the disk 107 although succeeding in writing the data (New Data) 108 to the disk 104, due to badly-timed writing to the disks and contamination of the disk 107. In such cases, the parity buffer 312 retains the parity data (New Parity). Therefore, if the host computer 101 issues another command to write data to the disks 104 to 107, there arises a problem of running out of a capacity of the parity buffer 312. To solve this problem, in the RAID system 100 of this embodiment, the parity data (New Parity) 111 that could not be written to the disk 107 is temporarily written to the disk 106. Then, the RAID system 100 deallocates the parity buffer 312. To be specific, the data write unit 304 executes the following processing to write the parity data (New Parity) 111 to the disk 106.

If the data write unit 304 failed to write the parity data (New Parity) 111 to the disk 107, the data write unit 304 writes the parity data (New Parity) 111 to the disk 106. More specifically, the data write unit 304 writes the parity data (New Parity) 111 to an address range of data (Old Data) 206 corresponding to the parity data (New Parity) 111 in the disk 106. In other words, the data write unit 304 overwrites the data 206 in the disk 106 to the parity data (New Parity) 111. Thus, the RAID system 100 loses the data 206 stored in the disk 106. The CM 103 writes the parity data (New Parity) 111 to the disk 107 again and then generates the data (Old Data) 206 from the data (New Data) 108 stored in the disk 104, the data (Old Data) 205 stored in the disk 105, and the parity data (New Parity) 111 stored in the disk 106. As a result, the CM 103 can reconstruct the whole data stored in the RAID system 100 by writing the parity data (New Parity) 111 to the address range of the data (Old Data) 206 in the disk 106.

The consistency determining unit 305 performs processing for determining whether the parity data (New Parity) 111 could be written.

Further, if the RAID system 100 has a hot swap (HS) function, parity data (New Parity) can be written to a disk having the hot swap function. The hot swap function is to disconnect the disk 107 and switch connection to an alternative disk (backup disk) with the RAID system 100 being powered on.

Further, in the case of retrying to write the parity data (New Parity) 111 to the disk 107, the data write unit 304 specifies the parity data (New Parity) 111 in the data stored in the buffer. More specifically, the data write unit 304 references a parity bit in data and determines whether the data is the parity data (New Parity) 111. Then, the data write unit 304 writes the specified parity data (New Parity) 111 to the disk 107 again.

[2.5. Consistency Determining Unit 305]

The CPU 308 executes the consistency determining unit 305 to read parity data stored in the disk 107 to compare the parity data (New Parity) 111 stored in the parity buffer 312 with the parity data stored in the disk 107. If the consistency determining unit 305 determines that the parity data (New Parity) 111 is inconsistent with the parity data stored in the disk 107 as a result of comparing the parity data (New Parity) 111 stored in the parity buffer 312 with the parity data stored in the disk 107, it is determined that the data write unit 304 could not write the parity data (New Parity) 111 to the disk 106. Further, if the consistency determining unit 305 determines that the parity data (New Parity) 111 is consistent with the parity data stored in the disk 107 as a result of comparing the parity data (New Parity) 111 stored in the parity buffer 312 with the parity data stored in the disk 107, it is determined that the data write unit 304 could write the parity data (New Parity) 111 to the disk 106.

[2.6. Data Write-Back Unit 306]

The CPU 308 executes the data write-back unit 306 to write back the data (Old Data) 109 to the data buffer 311. If the data write unit 304 failed to write the parity data (New Parity) 111 to the disk 107, the data write-back unit 306 writes back the data (Old Data) 109 to the data buffer 311.

[2.7. Buffer Deallocating Unit 307]

The CPU 308 executes the buffer deallocating unit 307 to delete the parity data (New Parity) 111 stored in the parity buffer 312.

If the data write unit 304 writes the parity data (New Parity) 111 to the disk 106, the buffer deallocating unit 307 deletes the parity data (New Parity) 111 stored in the parity buffer 312. Further, the buffer deallocating unit 307 deletes the data (New Data) 108 stored in the cache 309. This is because the RAID system 100 stores the data (New Data) 108 in the disk 104, stores the data 205 in the disk 105, and the parity data (New Parity) 111 in the disk 106. In other words, since the RAID system 100 can generate the data 206 from the data (New Data) 108, the data 205, and the parity data (New Parity) 111, it is unnecessary to store the parity data (New Parity) 111 and the data (New Data) 108 in the parity buffer 312 and the cache 309, respectively.

In this embodiment, "to deallocate the data buffer 311, the parity buffer 312, and the cache 309" means to delete data stored in the data buffer 311, the parity buffer 312, and the cache 309 or to allow the memory 310 and the cache 309 to store another data.

[2.8. RAID Control Unit 601]

The CPU 308 executes the RAID control unit 601 to request the RAID recovery unit 602 to disconnect the disk 107.

If the buffer deallocating unit 307 deallocates the parity buffer 312 and the cache 309, the RAID control unit 601 requests the RAID recovery unit 602 to disconnect the disk 107.

Further, if receiving a request for rebuild processing from the RAID recovery unit 602, the RAID control unit 601 instructs the buffer allocating unit 301 to allocate a buffer and starts the rebuild processing.

[2.9. RAID Recovery Unit 602]

The CPU 308 executes the RAID recovery unit 602 to disconnect the disk 107 from the RAID system 100.

In response to the request from the RAID control unit 601, the RAID recovery unit 602 disconnects the disk 107 from the RAID system 100. The disconnection of the disk 107 means to break electrical connection between the CM 103 and the disk 107. Then, the RAID recovery unit 602 changes a RAID status (RAID STATUS) of the RAID system 100 from "available" to "exposed". The RAID recovery unit 602 determines whether the disk 107 is disconnected from the RAID system 100 under control. The RAID system 100 disconnected from the disk 107 is in the exposed status. The exposed status refers to irredundant configuration of the RAID system 100. The available status refers to redundant configuration of the RAID system 100.

Moreover, the RAID recovery unit 602 manages an operation of writing the parity data (New Parity) 111 and saves information (flag) about a disk (in this embodiment, the disk 106) to which the parity data (New Parity) 111 has been written. In other words, the RAID recovery unit 602 saves information indicating that the parity data (New Parity) 111 has been written to the disk 106.

Further, if the disk 107 to which the parity data (New Parity) 111 could not be written, is recovered, the RAID recovery unit 602 requests the RAID control unit 601 to execute rebuild processing. The rebuild processing is to restore the RAID system 100 to a redundant status (available status) from an irredundant status (exposed status).

[2.10. Data Validating Unit 901]

The CPU 308 executes the data validating unit 901 to check logical validation of a data block 1001 with reference to a BCC 1002.

[2.11. Data Generating Unit 902]

The CPU 308 executes the data generating unit 902 to perform exclusive OR of the data (New Data) 108, the data (Old Data) 205, and the parity data (New Parity) 111 to generate the data (Old Data) 206.

[3. Flowchart of Control Processing for Preventing Capacity Exhaustion of Parity Buffer 312]

Figure 4:
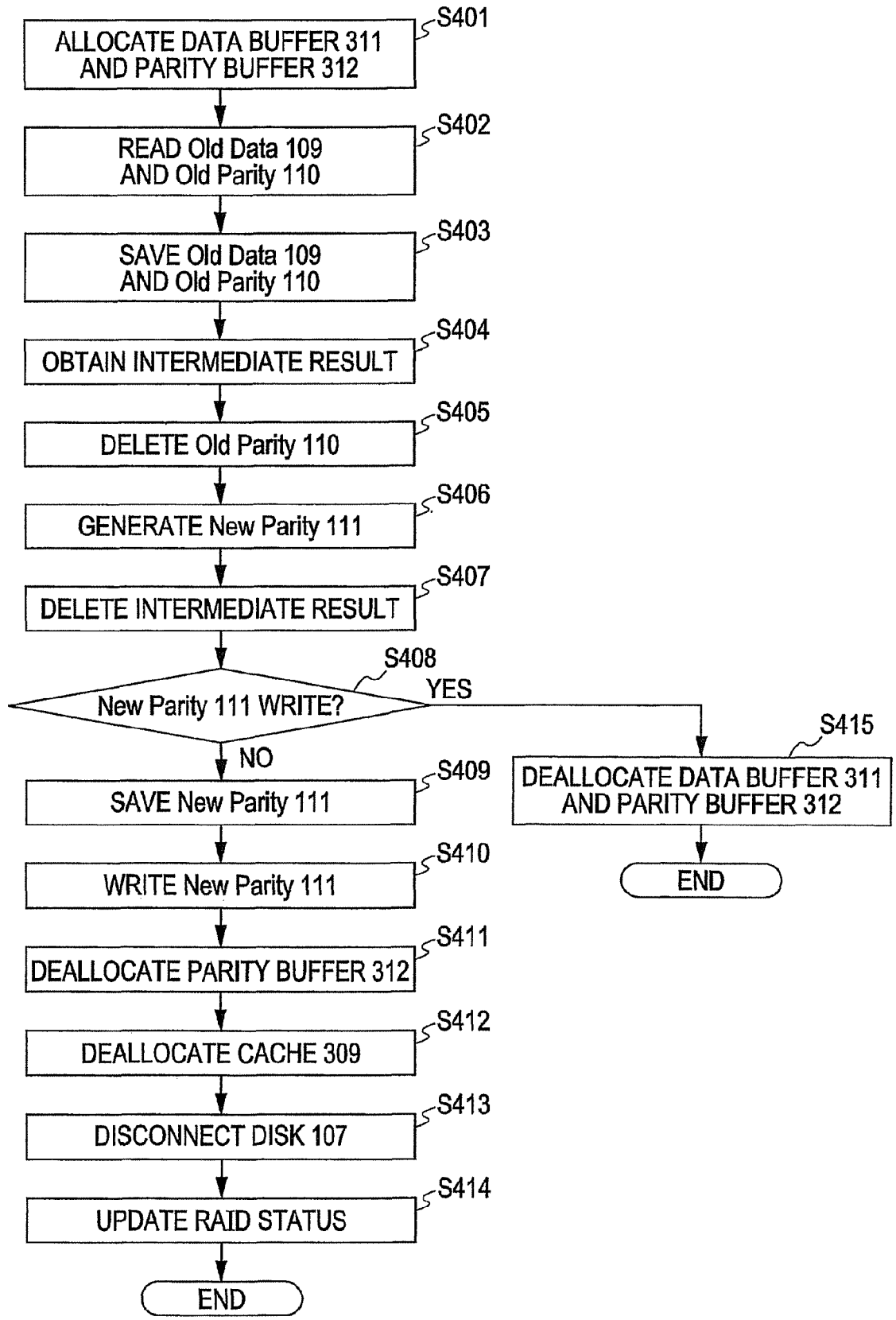
FIG. 4 is a flowchart of control processing for preventing capacity exhaustion of a parity buffer according to the embodiment of the present invention.

FIG. 4 is a flowchart of control processing for preventing capacity exhaustion of the parity buffer 312 with the CM 103 of this embodiment.

In response to a small write (Small Write) data write command from the host computer 101, the buffer allocating unit 301 allocates the data buffer 311 and the parity buffer 312 where the data (Old Data) 109 and the data (Old Parity) 110 are to be read, on the memory 310 (step S401).

After the buffer allocating unit 301 allocated the data buffer 311 and the parity buffer 312 on the memory 310, the data read unit 302 reads the data (Old Data) 109 and the parity data (Old Parity) 110 to the data buffer 311 and the parity buffer 312, respectively (step S402). The data buffer 311 stores the data (Old Data) 109 and the parity buffer 312 stores the parity data (Old Parity) 110 (step S403).

The parity generating unit 303 performs exclusive OR (XOR) of the data (Old Data) 109 in the data buffer 311 and the parity data (Old Parity) 110 in the parity buffer 312 to obtain an intermediate result (step S404). The parity generating unit 303 temporarily stores the intermediate result in the parity buffer 312 and deletes the parity data (Old Parity) 110 from the parity buffer 312 (step S405). Then, the parity generating unit 303 performs exclusive OR (XOR) of the intermediate result and the data (New Data) 108 saved in the cache 309 to generate the parity data (New Parity) 111 (step S406). The parity generating unit 303 stores the parity data (New Parity) 111 in the parity buffer 312 and deletes the intermediate result from the parity buffer 312 (step S407).

Then, the data write unit 304 tries to write the data (New Data) 108 and the parity data (New Parity) 111 to the disk 104 and the disk 107, respectively to determine whether the parity data (New Parity) 111 can be written (step S408). The consistency determining unit 305 reads the parity data stored in the disk 107. Then, the consistency determining unit 305 compares the parity data (New Parity) 111 stored in the parity buffer 312 with the parity data stored in the disk 107. If the consistency determining unit 305 determines that the parity data (New Parity) 111 is inconsistent with the parity data stored in the disk 107 as a result of comparing the parity data (New Parity) 111 stored in the parity buffer 312 with the parity data stored in the disk 107, it is determined that the data write unit 304 could not write the parity data (New Parity) 111 to the disk 106 (NO in step S408). Further, if the consistency determining unit 305 determines that the parity data (New Parity) 111 is consistent with the parity data stored in the disk 107 as a result of comparing the parity data (New Parity) 111 stored in the parity buffer 312 with the parity data stored in the disk 107, it is determined that the data write unit 304 could write the parity data (New Parity) 111 to the disk 106 (YES in step S408).

If it is determined that the data write unit 304 could write the data (New Data) 108 and the parity data (New Parity) 111 to the disk 104 and the disk 107, respectively (YES in step S408), the buffer deallocating unit 307 deletes the parity data (New Parity) 111 stored in the parity buffer 312 and the data (Old Data) 109 stored in the data buffer 311 (step S415). The CM 103 terminates the data write processing. If it is determined that the data write unit 304 could not write the parity data (New Parity) 111 to the disk 107 (NO in step S408), the parity buffer 312 retains the parity data (New Parity) 111 (step S409).

Then, the data write unit 304 writes the parity data (New Parity) 111 to the disk 106 (step S410). To be specific, the data write unit 304 writes the parity data (New Parity) 111 to an address range of the data (Old Data) 206 corresponding to the parity data (New Parity) 111 in the disk 106. In other words, the data write unit 304 overwrites the data 206 in the disk 106 to the parity data (New Parity) 111. Here, the data write unit 304 references a block ID of the data (Old Data) 206 to specify the data (Old Data) 206 and write the parity data (New Parity) 111 within an address range of the data (Old Data) 206. Further, the data write unit 304 writes identification information representing an address range where the parity data (New Parity) 111 has been written(address range where the data (Old Data) 206 has been written) to a block ID 1004 for the parity data (New Parity) 111 (see FIG. 10).

Then, the buffer deallocating unit 307 deletes the parity data (New Parity) 111 from the parity buffer 312 (step S411). Moreover, the buffer deallocating unit 307 deletes the data (New Data) 108 from the cache 309 (step S412). This is because the parity data (New Parity) 111 is stored in the disk 106 and the data (New Data) 108 is stored in the disk 104, and thus, the data in the disks 104 to 107 are consistent with one another and the RAID system 100 can recover the data (Old Data) 206. Then, since the parity data (Old Parity) 110 inconsistent with the data in the disks 104 to 107 is stored in the disk 107, the CM 103 disconnects the disk 107.

The RAID control unit 601 requests the RAID recovery unit 602 to disconnect the disk 107 (break electrical connection). In response to the request from the RAID control unit 601, the RAID recovery unit 602 disconnects the disk 107 from the RAID system 100 (step S413). The RAID recovery unit 602 changes the RAID status (RAID STATUS) of the RAID system 100 from "available" to "exposed" (step S414).

Figure 5:
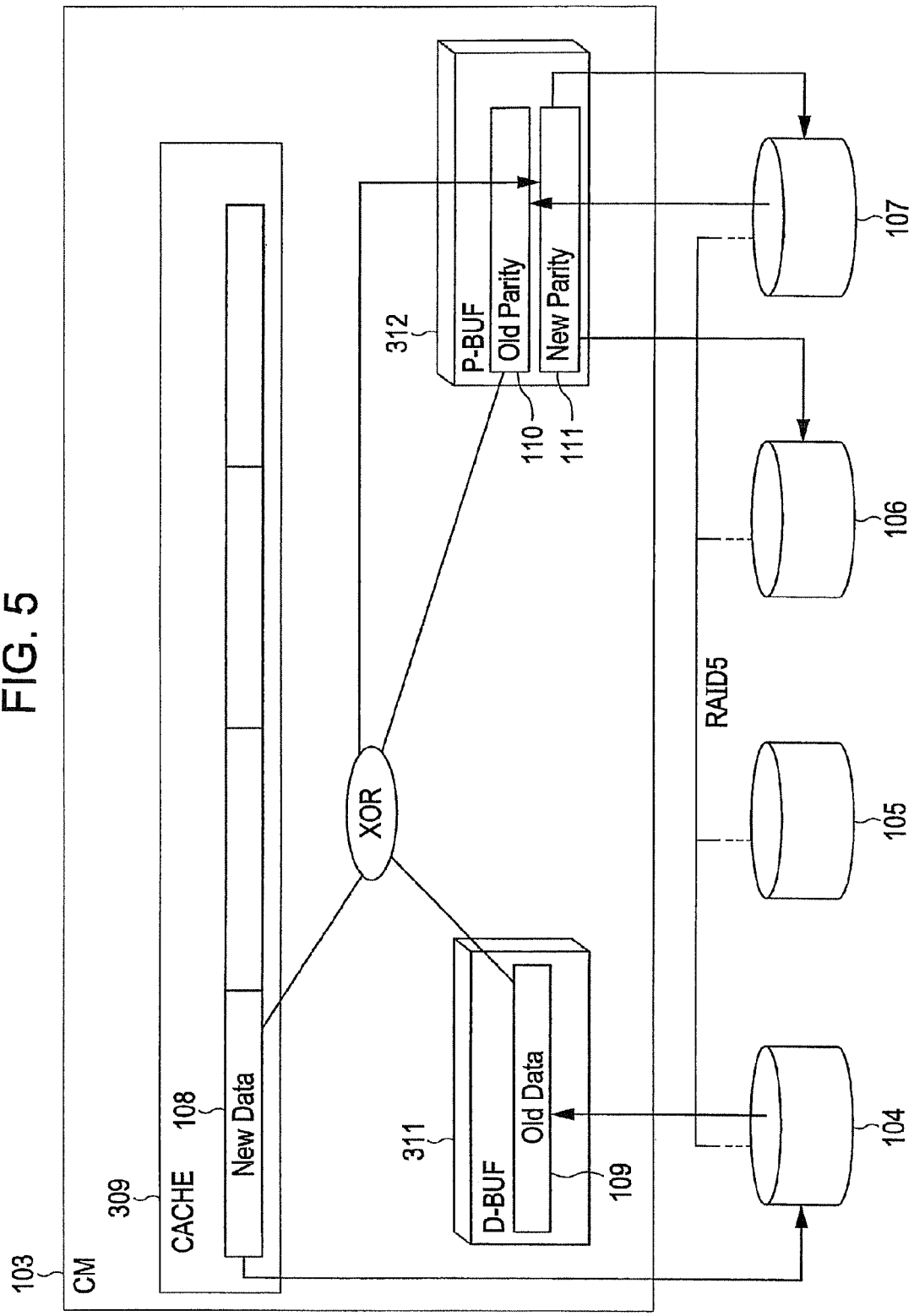
FIG. 5 is a schematic diagram illustrating control for preventing capacity exhaustion of a parity buffer according to the embodiment of the present invention.
Figure 6:
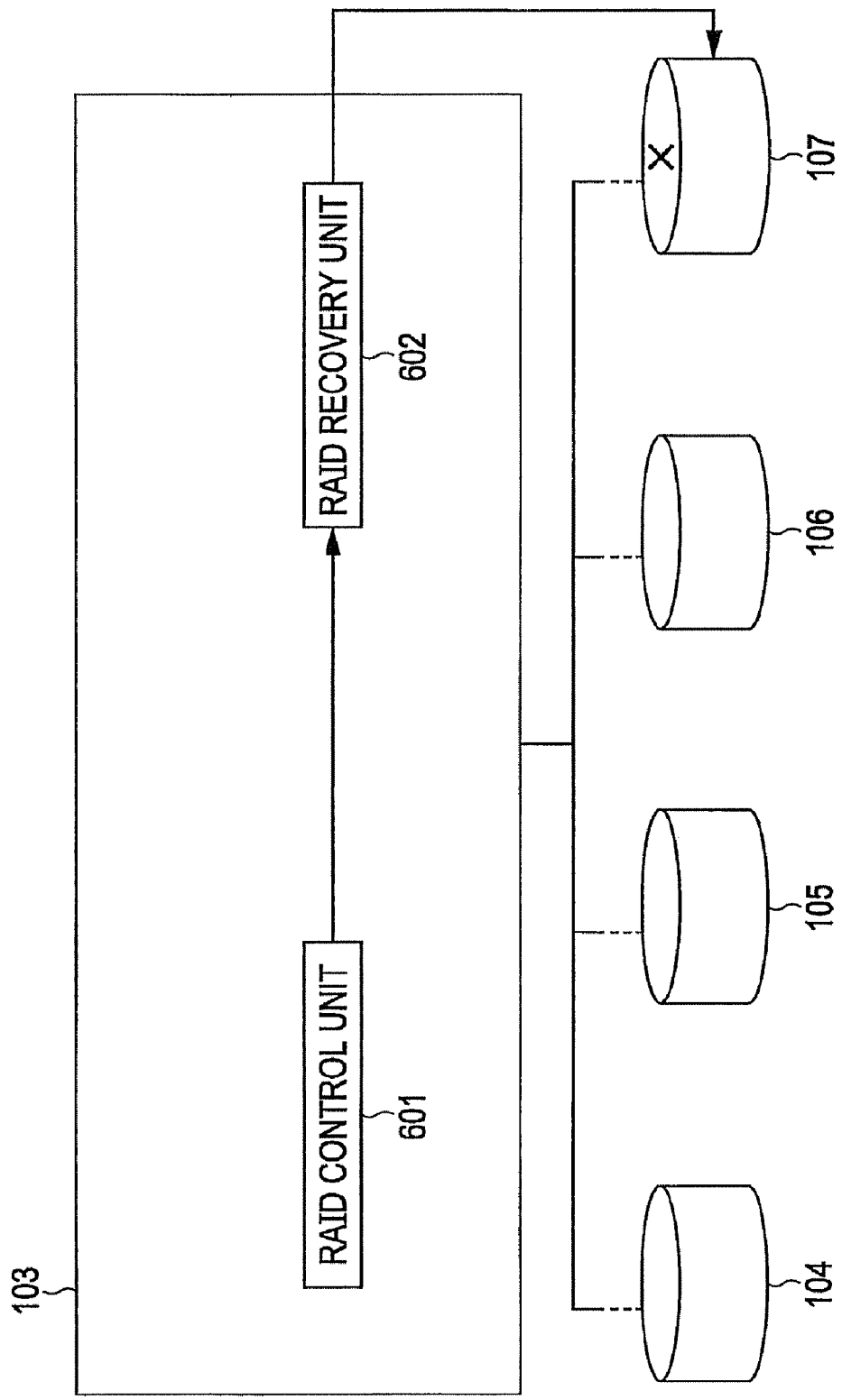
FIG. 6 is a schematic diagram illustrating control for preventing capacity exhaustion of a parity buffer according to the embodiment of the present invention.

The control processing for preventing exhaustion of a buffer capacity in the flowchart of FIG. 4 is illustrated in FIGS. 5 and 6. FIG. 5 shows processing for writing the parity data (New Parity) 111 to the disk 106 with the CM 103. FIG. 6 shows processing for disconnecting the disk 107 with the CM 103.

The buffer allocating unit 301 of the CM 103 allocates the data buffer 311 and the parity buffer 312 on the memory 310. Subsequently, the data read unit 302 of the CM 103 reads the data (Old Data) 109 and the parity data (Old Parity) 110 to the data buffer 311 and the parity buffer 312, respectively. The data read unit 302 of the CM 103 saves the data (Old Data) 109 and the parity data (Old Parity) 110 in the data buffer 311 and the parity buffer 312, respectively. The parity generating unit 303 performs exclusive OR (XOR) of the data (Old Data) 109, the parity data (Old Parity) 110, and the data (New Data) 108 to generate the parity data (New Parity) 111. The parity generating unit 303 stores the parity data (New Parity) 111 in the parity buffer 312. Then, the data write unit 304 tries to write the data (New Data) 108 to the disk 104 and write the parity data (New Parity) 111 to the disk 107.

If the data write unit 304 could not write the parity data (New Parity) 111 to the disk 107, the parity buffer 312 retains the parity data (New Parity) 111. Then, the data write unit 304 writes the data (New Parity) 111 to the disk 107. The buffer deallocating unit 307 deletes the parity data (New Parity) 111 from the parity buffer 312. Moreover, the buffer deallocating unit 307 deletes the data (New Data) 108 from the cache 309.

The RAID recovery unit 602 disconnects the disk 107 from the RAID system 100 to change the RAID status (RAID STATUS) of the RAID system 100 from "available" to "exposed".

A description is next given of processing for recovery from an error in writing the parity data (New Parity) 111, which is executed by the CM 103.

[4. Flowchart of Rebuild Processing]

Figure 7:
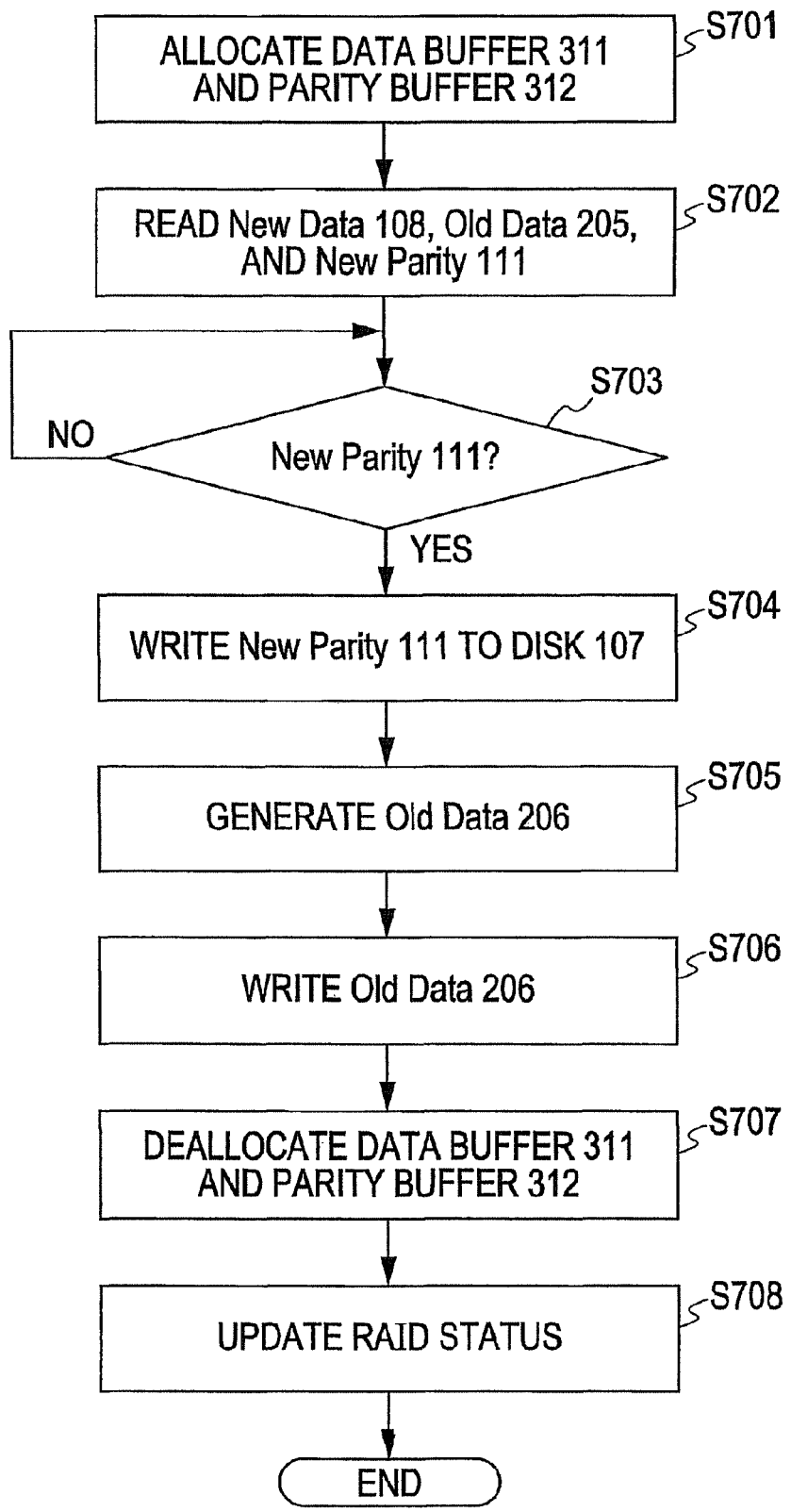
FIG. 7 is a flowchart of rebuild processing according to the embodiment of the present invention.
Figure 8:
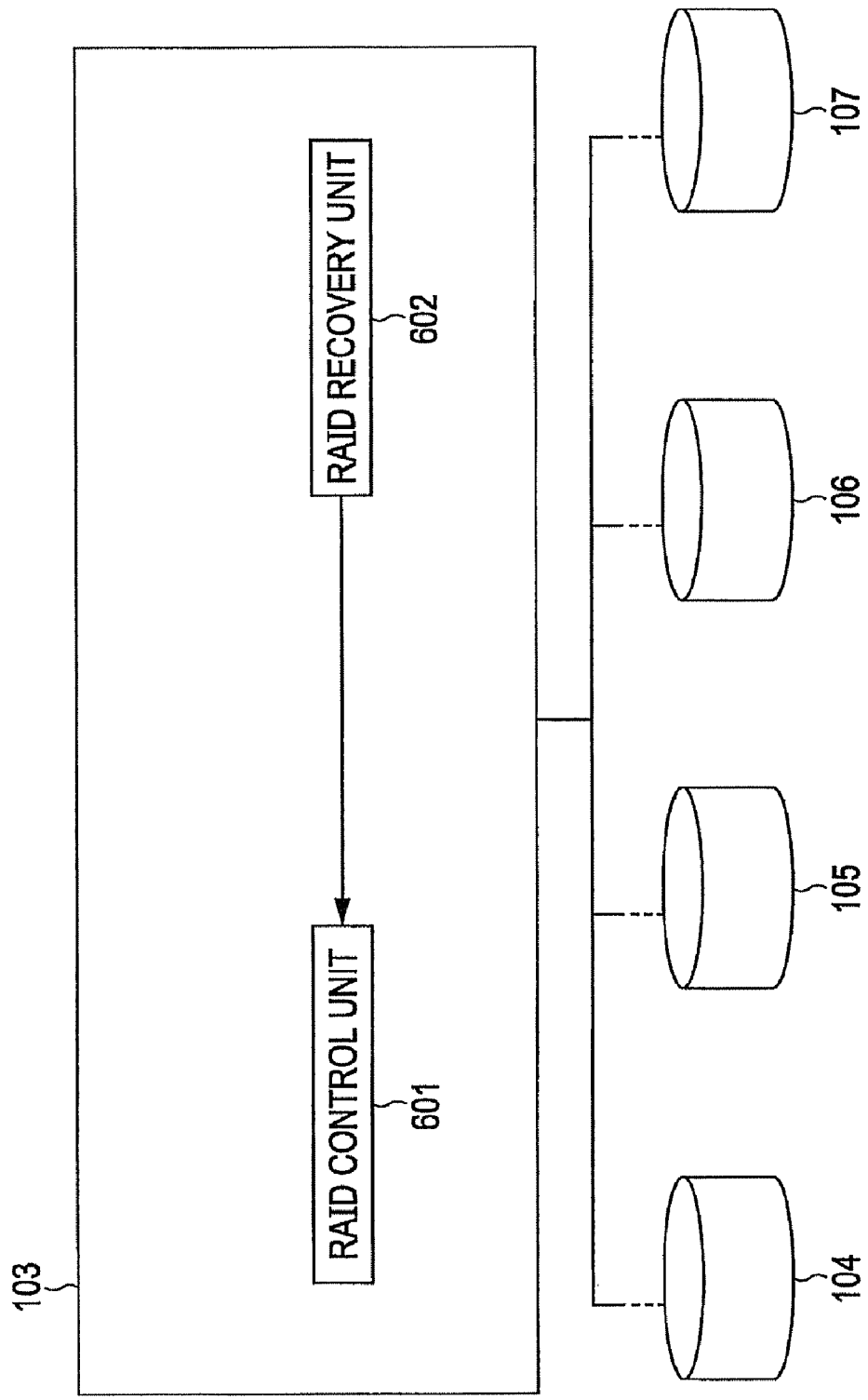
FIG. 8 is a schematic diagram of rebuild processing according to the embodiment of the present invention.
Figure 9:
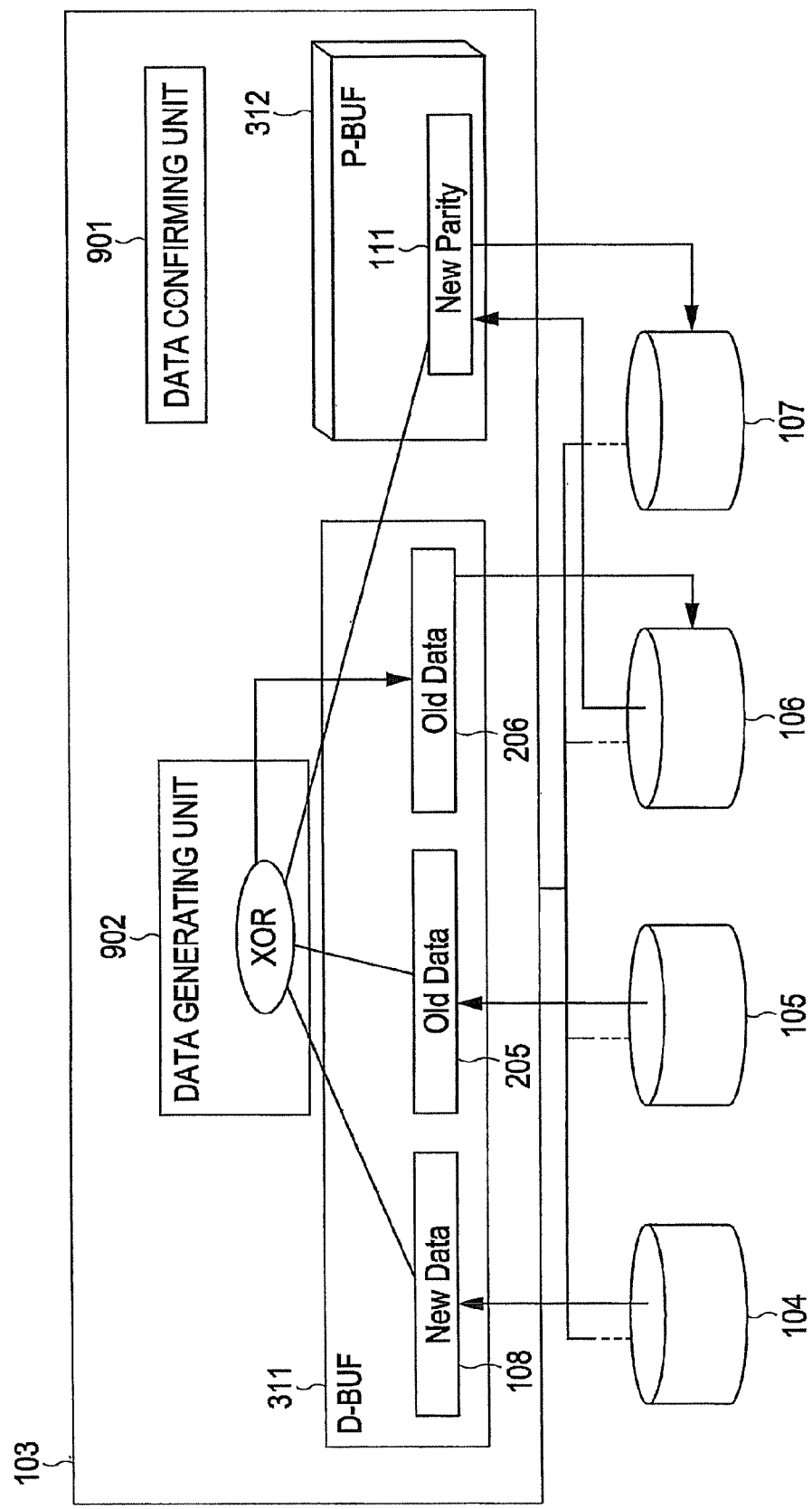
FIG. 9 is a schematic diagram of rebuild processing according to the embodiment of the present invention.

FIG. 7 is a flowchart of rebuild processing of this embodiment. FIGS. 8 and 9 are schematic diagrams of the rebuild processing of this embodiment.

When the data write unit 304 writes the parity data (New Parity) to the disk 106, the RAID recovery unit 602 disconnects the disk 107 from the RAID system 100 to change the RAID status (RAID STATUS) of the RAID system 100 to Exposed status (status illustrated in steps S413 and S414 of FIG. 4).

Then, if the disk 107 to which the parity data (New Parity) 111 could not be written, is recovered, the CM 103 performs the following processing.

As shown in FIG. 8, the RAID recovery unit 602 requests the RAID control unit 601 to execute the rebuild processing. The rebuild processing refers to processing for restoring the status of the RAID system 100 from the irredundant configuration (exposed status) to the redundant configuration (available status). Then, the RAID control unit 601 instructs the buffer allocating unit 301 to allocate a buffer and start the rebuild processing.

The buffer allocating unit 301 allocates the data buffer 311 and the parity buffer 312 on the memory 310 (step S701). Then, the data read unit 302 reads the data (New Data) 108 and the data (Old Data) 205 to the data buffer 311 and reads the parity data (New Parity) 111 to the parity buffer 312 (step S702).

Figure 10:
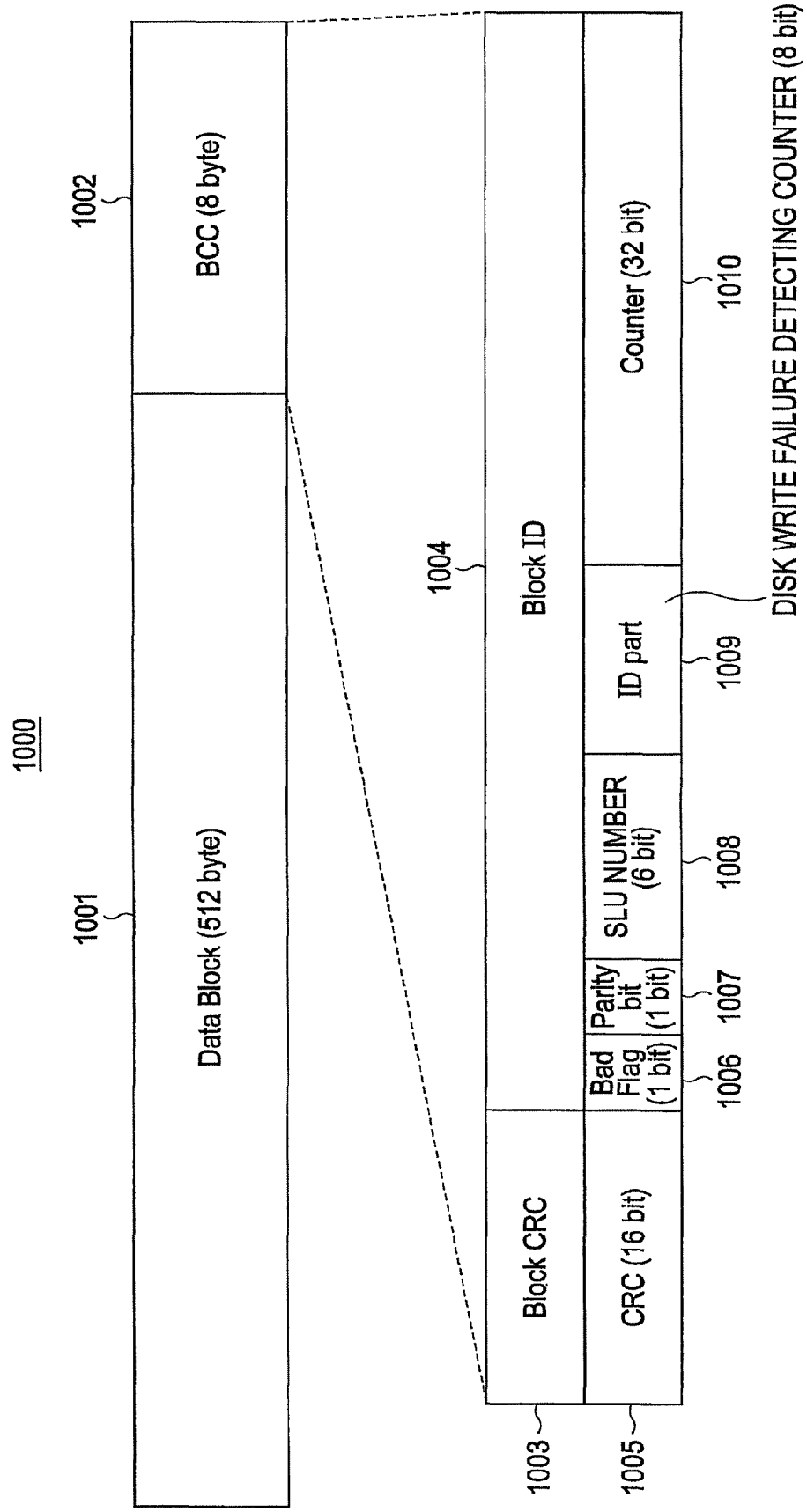
FIG. 10 is a diagram of parity data (New Parity) according to the embodiment of the present invention.

FIG. 10 is a diagram of the parity data (New Parity) 111 of this embodiment.

The data structure of each of the data (New Data) 108, the data (Old Data) 109, and the parity data (Old Parity) 110 is the same as the parity data (New Parity) 111 in this embodiment.

The parity data (New Parity) 111 is composed of a 512-byte data block (Data Block) 1001 and an 8-byte BCC (Block Check Code) 1002. The data block 1001 is a result of exclusive OR of user data portions of the data (New Data) 108, the data (Old Data) 205, and the data (Old Data) 206. The BCC 1002 is information the CM 103 uses to check logical validation of the data block 1001. In this embodiment, the data validating unit 901 references the BCC 1002 to check logical validation of the data block 1001. To check the logical validation of the data block 1001 means to determine whether the data block 1001 is defective or whether a logical data position of the parity data (New Parity) 111 on the disk is right.

Further, the BCC 1002 is composed of a 2-byte block CRC (Block CRC) 100 as a redundancy code for detecting an error of the parity data (New Parity) 111 and a 6-byte block ID (Block ID) 1004 as positional information used for checking a logical data position of the data block 1001.

The block ID 1004 is composed of a 1-bit Bad flag (Bad Flag) 1006, a 1-bit parity bit (parity bit) 1007, a 6-bit SLU number 1008, an 8-bit disk write failure detecting counter 1009, and a 32-bit counter 1010. The block ID 1004 is information about a block of the disk 106 to which the parity data (New Parity) 111 has been written. With this structure, even if the data write unit 304 writes the parity data (New Parity) 111 to the disk 106, the data read unit 302 can identify a block of the disk 106, from which the parity data (New Parity) 111 is to be read, and can write the data to the parity buffer 312.

The Bad flag 1006 indicates that the parity data (New Parity) 111 involves an error (defective data).

The parity bit 1007 is information representing that the parity data (New Parity) 111 is parity data. In this case, the parity bit is set to "1". If the parity bit 1007 is set to "0", target data is not parity data. In other words, the parity bit (parity bit 1007 and parity bit included in other data) is information about whether target data is parity data. The SLU number 1008 indicates an identification number of a logical unit including the parity data (New Parity) 111.

The SLU number 1008 indicates an identification number of a logical unit regardless of whether the parity data (New Parity) 111 is included.

The disk write failure detecting counter 1009 is used to detect a failure in writing data to a disk. The counter 1010 is information for checking whether fields of different values in blocks of a logical unit, in data block positional information (Block ID) and the data block are data stored at a predetermined block address in a logical volume.

Then, the data write unit 304 determines which one of the data (New Data) 108, data (Old Data) 205, and parity data (New Parity) 111 stored in the data buffer 311 and the parity buffer 312 corresponds to the parity data (New Parity) 111 (step S703). This determination is made with reference to a parity bit in each of the data (New Data) 108, data (Old Data) 205, and parity data (New Parity) 111. The parity bit 1007 for the parity data (New Parity) 111 is "1" and the parity bit for the data (New Data) 108 and data (Old Data) 205 is "0". Thus, the data write unit 304 can identify the parity data (New Parity) 111. Further, the CM 103 stores information representing that the parity data (New Parity) 111 should be originally written to the disk 107 in a storage unit different from the cache 309 and the memory 310 (not shown; hereinafter referred to as "different storage unit"). In other words, the CM 103 stores information representing that the parity data (New Parity) 111 should be stored in the disk 107 in the different storage unit.

If the data write unit 304 references a parity bit of data and determines that the data is not the parity data (New Parity) 111 (NO in step S703), the data write unit 304 references a parity bit of the next data to determine whether the data is the parity data (New Parity) 111 (step S703).

If the data write unit 304 references a parity bit of the next data to determine that the data is the parity data (New Parity) 111 (YES in step S703), the data write unit 304 writes the parity data (New Parity) 111 to the disk 107 again (step S704). At the time of writing the parity data (New Parity) 111, the data write unit 304 references information stored in the different storage unit to determine that the parity data (New Parity) 111 should be stored in the disk 107, based on the information to write the parity data (New Parity) 111 to the disk 107.

Then, the data generating unit 902 performs exclusive OR of the data (New Data) 108, the data (Old Data) 205, and the parity data (New Parity) 111 to generate the data (Old Data) 206 and store the generated data in the data buffer 311 (step S705). Then, the data write-back unit 306 writes the generated data (Old Data) 206 in the disk 106 (step S706). Then, the buffer deallocating unit 307 deletes the data (New Data) 108 and the data (Old Data) 205 and 206 from the data buffer 311. Further, the buffer deallocating unit 307 deletes the parity data (New Parity) 111 from the parity buffer 312 (step S707).

The RAID recovery unit 602 changes the RAID status (RAID STATUS) of the RAID system 100 from "exposed" to "available" (step S708). The RAID recovery unit 602 changes the RAID status to "available status" to thereby allow the RAID system 100 to recover to the redundant configuration.

If the RAID system 100 has a hot swap function (not shown), the RAID recovery unit 602 carries out the following determination processing. The RAID recovery unit 602 determines whether a hot-swap backup disk (not shown) is provided. If the RAID recovery unit 602 determines that the RAID system 100 includes a hot-swap backup disk, it is determined whether the backup disk is unused. If the RAID recovery unit 602 determines that the backup disk is unused, the RAID recovery unit 602 requests the RAID control unit 601 to execute rebuild processing. Then, the RAID control unit 601 instructs the buffer allocating unit 301 to allocate a buffer and starts the rebuild processing. The CM 103 starts the rebuild processing to write the parity data (New Parity) 111 again.

Second Embodiment

Figure 11:
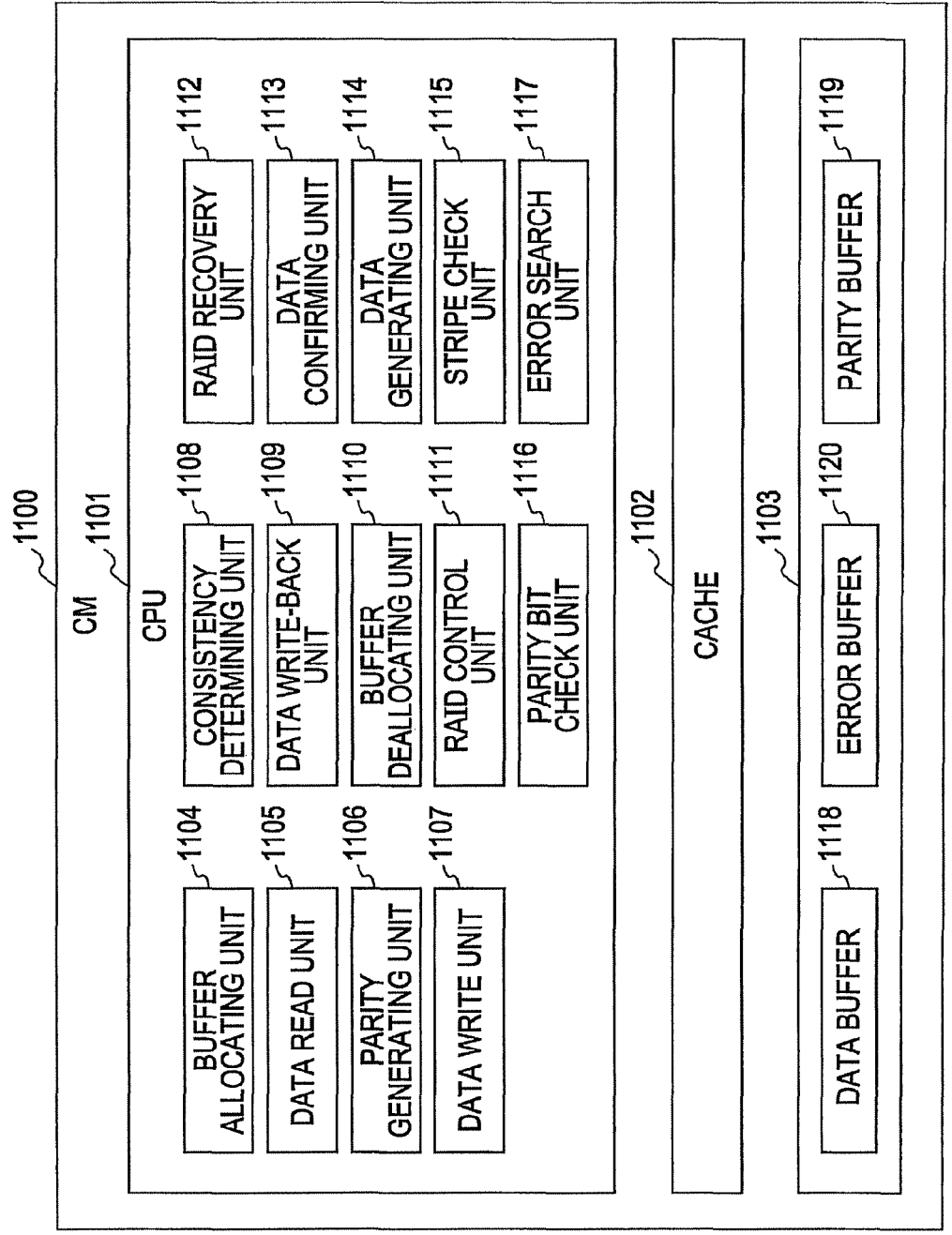
FIG. 11 is a functional block diagram of a CM according to an embodiment of the present invention

A RAID system incorporating a CM 1100 according to a second embodiment of the present invention will be described next. The configuration of the RAID system is the same as that of the RAID system 100 in FIG. 1 except that the CM 103 is replaced by the CM 1100. FIG. 11 is a functional block diagram of the CM 1100 of this embodiment.

[5. CM 1100]

The CM 1100 is composed of a CPU 1101, a cache 1102, and a memory 1103. The CPU 1101 executes a buffer allocating unit 1104, a data read unit 1105, a parity generating unit 1106, a data write unit 1107, a consistency determining unit 1108, a data write-back unit 1109, a buffer deallocating unit 1110, a RAID control unit 1111, a RAID recovery unit 1112, a data validating unit 1113, a data generating unit 1114, a stripe check unit 1115, a parity bit check unit 1116, and an error search unit 1117 to control the RAID system. Further, the CM 1100 allocates a data buffer 1118, a parity buffer 1119, and an error buffer 1120 on the memory 1103 to control data transfer in the RAID system. The cache 1102 temporarily stores data as a target for a write command issued from a host computer and data as a target for a read command issued from the host computer. Upon the completion of writing data to the cache 1102, the CM 1100 sends back a message to that effect to the host computer. The CM 1100 can perform a so-called write-back operation of writing data in the cache 1102 to disks 1201 to 1204 not in sync with an operation of the host computer on account of installation of the cache 1102, and can process data at a high speed.

[5.1. Buffer Allocating Unit 1104]

The CPU 1101 executes the buffer allocating unit 1104 to allocate the data buffer 1118 and the parity buffer 1119 on the memory 1103. If the host computer issues a small write (Small Write) data write command, the buffer allocating unit 1104 allocates the data buffer 1118 and the parity buffer 1119 to which data (Old Data) 1206 and data (Old Parity) 1207 are to be read, on the memory 1103. More specifically, the buffer allocating unit 301 executes processing for allocating an area enough to store the data (Old Data) 1206 and the data (Old Parity) 1207 within a predetermined address range in the memory 1103.

The data buffer 1118 allocated on the memory 1103 with the buffer allocating unit 1104 has a capacity barely enough to store the data (Old Data) 1206 and equal to or equivalent to a size of the data (Old Data) 1206. Likewise, the parity buffer 1119 allocated on the memory 1103 with the buffer allocating unit 1104 has a capacity barely enough to store the parity data (Old Parity) 1207 and equal to or equivalent to a size of the parity data (Old Parity) 1207. This is because a rate of error that causes capacity exhaustion of the data buffer 1118 and the parity buffer 1119 is low.

[5.2. Data Read Unit 1105]

The CPU 1101 executes the data read unit 1105 to read the data (Old Data) 1206 to the data buffer 1118 and read the parity data (Old Parity) 1207 to the parity buffer 1119. After the buffer allocating unit 1104 allocated the data buffer 1118 and the parity buffer 1119 on the memory 1103, the data read unit 1105 reads the data (Old Data) 1206 to the data buffer 1118 and reads the parity data (Old Parity) 1207 to the parity buffer 1119. The data read unit 1105 stores the data (Old Data) 1206 and the parity data (Old Parity) 1207 in the data buffer 1118 and the parity buffer 1119, respectively.

[5.3. Parity Generating Unit 1106]

The CPU 1101 executes the parity generating unit 1106 to generate the parity data (New Parity) 1208. First, the parity generating unit 1106 performs exclusive OR (XOR) of the data (Old Data) 1206 in the data buffer 1118, the parity data (Old Parity) 1207 in the parity buffer 1119, and the data (New Data) 1205 in the cache 1102 to generate parity data (New Parity) 1208.

[5.4. Data Write Unit 1107]

The CPU 1101 executes the data write unit 1107 to try to write the data (New Data) 1205 and the parity data (New Parity) 1208 to the disk 1201 and the disk 1204, respectively. If the data write unit 1107 can normally execute the write processing, the data (New Data) 1205 and the parity data (New Parity) 1208 can be written to the disk 1201 and the disk 1204, respectively.

In some cases, however, the data write unit 1107 cannot write the parity data (New Parity) 1208 to the disk 1204 although succeeding in writing the data (New Data) 1205 to the disk 1201, due to badly-timed writing to the disks and contamination of the disk 1204.

The CM 1100 of this embodiment releases the parity data (New Parity) 1208 that could not be written to the disk 1204 from the parity buffer 1119 and deallocates the parity buffer 1119 through the following processing.

The buffer allocating unit 1104 allocates an error buffer 1120 on the memory. Then, the data write unit 1107 writes a stripe number (stripe_no) 1209, a disk number (Disk_no) 1210, and a parity bit (parity_bit) 1211 concerning a write error to the error buffer 1120. The stripe number 1209, the disk number 1210, and the parity bit 1211 are trigger information for reading plural data constituting a stripe in the disks 1201 to 1204. The stripe number 1209 is a number of a stripe to which the parity data (New Parity) 1208 that could not be written with the data write unit 1107 belongs. The disk number 1210 is a number for identifying the disk 1204 to which the data write unit 1107 failed to write the parity data (New Parity) 1208. Further, the parity bit 1211 is information about whether to generate new parity data (New Parity) 1208 with the parity generating unit 1106. If the data write unit 1107 failed to write the parity data (New Parity) 1208, the parity bit is set to "0".

[5.5. Consistency Determining Unit 1108]

The CPU 1101 executes the consistency determining unit 1108 to read parity data stored in the disk 1204 to compare the parity data (New Parity) 1208 stored in the parity buffer 1119 with the parity data stored in the disk 1204. If the consistency determining unit 1108 determines that the parity data (New Parity) 1208 is inconsistent with the parity data stored in the disk 1204 as a result of comparing the parity data (New Parity) 1208 stored in the parity buffer 1119 with the parity data stored in the disk 1204, it is determined that the data write unit 1107 could not write the parity data (New Parity) 1208 to the disk 1204. Further, the consistency determining unit 1108 determines that the parity data (New Parity) 1208 is consistent with the parity data stored in the disk 1204 as a result of comparing the parity data (New Parity) 1208 stored in the parity buffer 1119 with the parity data stored in the disk 1204, it is determined that the data write unit 1107 could write the parity data (New Parity) 1208 to the disk 1204.

[5.6. Data Write-Back Unit 1109]

The CPU 1101 executes the data write-back unit 1109 to write back data and parity data to the data buffer, the parity buffer, or the cache 1102 from the disks 1201 to 1204.

[5.7. Buffer Deallocating Unit 1110]

The CPU 1101 executes the buffer deallocating unit 1110 to delete the parity data (New Parity) 1208 stored in the parity buffer 1119.

Further, the buffer deallocating unit 1110 deletes the data (Old Data) 1206 stored in the data buffer 1118. In addition, the buffer deallocating unit 1110 deletes the data (New Data) 1205 stored in the cache 1102.

Further, the buffer deallocating unit 1110 deallocates the error buffer 1120 if an error stripe is recovered.

In this embodiment, "to deallocate the data buffer 1118, the parity buffer 1119, the error buffer 1120, and the cache 1102" means to delete data stored in the data buffer 1118, the parity buffer 1119, and the cache 1102 to store another data in the memory 1103 and the cache 1102.

[5.8. RAID Control Unit 1111]

In response to a request to execute rebuild processing from the RAID recovery unit 1112, the RAID control unit 1111 instructs the buffer allocating unit 1104 to allocate a buffer and starts the rebuild processing.

[5.9. RAID Recovery Unit 1112]

If the disk 1204 to which the parity data (New Parity) 1208 could not be written, is recovered, the CPU 1101 executes the RAID recovery unit 1112, and the RAID recovery unit 1112 requests the RAID control unit 1111 to execute rebuild processing. The rebuild processing is to restore the RAID system to a redundant status (available status) from an irredundant status (exposed status).

[5.10. Data Validating Unit 1113]

The CPU 1101 executes the data validating unit 1113 to check logical validation of a data block with reference to a BCC.

[5.11. Data Generating Unit 1114]

The CPU 1101 executes the data generating unit 1114 to perform exclusive OR of the data (New Data) 1206 and the data (Old Data) 1302 and 1303 to generate the parity data (New Parity) 1208. The data generating unit 1114 generates the parity data (New Parity) 1208 based on the recovery processing (rebuild processing) executed by the RAID control unit 1111.

[5.12. Stripe Check Unit 1115]

The CPU 1101 executes the stripe check unit 1115 to check a stripe number of data as a target for a new write command or read command issued from the host computer. To be specific, the stripe check unit 1115 compares the stripe number 1209 stored in the error buffer 1120 with a stripe number of data as a target for a new write command or read command issued from the host computer and determines whether the two numbers match with each other. If the memory 1103 includes no error buffer 1120 or the stripe check unit 1115 determines that no stripe number 1209 is stored in the error buffer 1120, the stripe check unit does not check a stripe number of data as a target for a new write command or read command issued from the host computer.

In other words, if the data write unit 1107 fails to write the data (New Data) 1205 or the parity data (New Parity) 1209 and then, tries to newly write the data (New Data) 1301 to the disk 1202, the stripe check unit 1115 checks a stripe where the data (New Data) 1301 is to be written.

[5.13. Parity Bit Check Unit 1116]

The CPU 1101 executes the parity bit check unit 1116 to check the parity bit 1211 in the error buffer 1120.

In this embodiment, the data write unit 1107 sets the parity bit 1211 (sets the parity bit to "1") in the following cases. That is, the data write unit 1107 sets the parity bit 1211 in the case where the data write unit 1107 failed to write the data (New Data) 1205 and successfully wrote the parity data (New Parity) 1208. If the data write unit 1107 successfully wrote the data (New Data) 1205 and the parity data (New Parity) 1208, the parity bit 1211 is not set (parity bit is set to "0").

The CM 1100 can determine which of the data (New Data) 1205 and the parity data (New Parity) 1208 could not be written, by the parity bit check unit 1116 checking the parity bit 1211.

[5.14. Error Search Unit 1117]

The CPU 1101 executes the error search unit 1117 to determine whether stripes constituting the disk caused any error. The error search unit 1117 compares the disk number 1210 stored in the error buffer 1120 with a disk number indicating a number of a disk to/from which data is to be written/read to thereby determine whether an error occurs in a stripe to/from which data is to be written/read.

[6. Flowchart of Control Processing for Preventing Capacity Exhaustion of Parity Buffer 1119]

Figure 14:
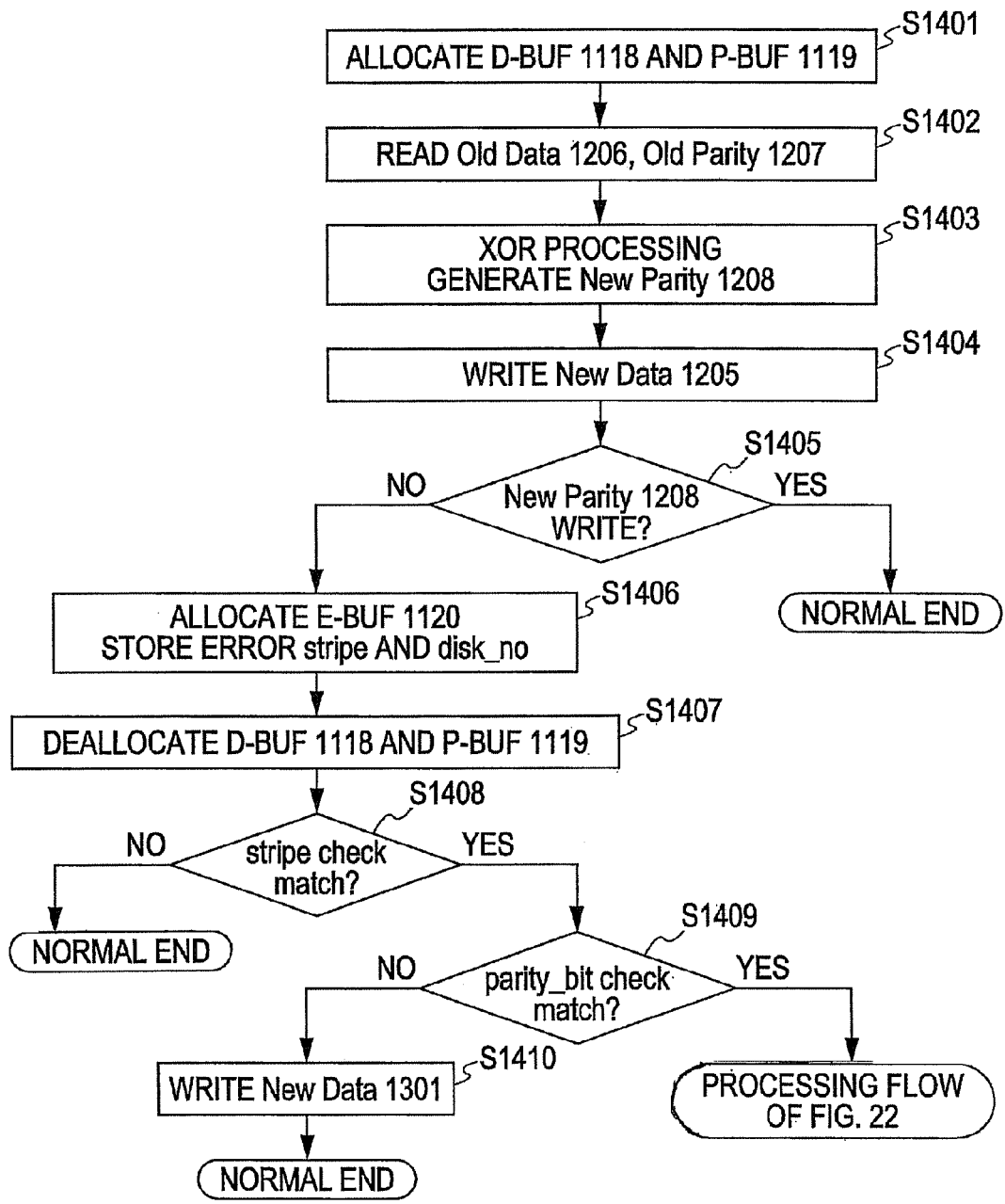
FIG. 14 is a flowchart of control processing for preventing capacity exhaustion of a parity buffer with a CM according to the embodiment of the present invention.

FIG. 14 is a flowchart of control processing for preventing capacity exhaustion of the parity buffer 1119 with the CM 1100 of this embodiment.

In response to a small write (Small Write) data write command from the host computer, the buffer allocating unit 1104 allocates the data buffer 1118 and parity buffer 1119 where the data (Old Data) 1206 and the data (Old Parity) 1207 are to be read, on the memory 1103 (step S1401).

After the buffer allocating unit 1104 allocated the data buffer 1118 and parity buffer 1119 on the memory 1103, the data read unit 1105 reads the data (Old Data) 1206 and the parity data (Old Parity) 1207 to the data buffer 1118 and the parity buffer 1119, respectively. The data buffer 1118 stores the data (Old Data) 1206 and the parity buffer 1119 stores the parity data (Old Parity) 1207 (step S1402).

The parity generating unit 1106 performs exclusive OR (XOR) of the data (Old Data) 1206 in the data buffer 1118 and the parity data (Old Parity) 1207 in the parity buffer 1119 and performs exclusive OR (XOR) of an intermediate result and the data (New Data) 1205 stored in the cache 1102 to generate the parity data (New Parity) 1208 (step S1403).

Then, the data write unit 1107 tries to write the data (New Data) 1205 and the parity data (New Parity) 1208 to the disk 1201 and the disk 1204, respectively (step S1404). The consistency determining unit 1108 determines whether the parity data (New Parity) 1208 could be written to the disk 1204 (step S1405). The consistency determining unit 1108 reads the parity data stored in the disk 1204. Then, the consistency determining unit 1108 compares the parity data (New Parity) 1208 stored in the parity buffer 1119 with the parity data stored in the disk 1204. If the consistency determining unit 1108 determines that the parity data (New Parity) 1208 is inconsistent with the parity data stored in the disk 1204 as a result of comparing the parity data (New Parity) 1208 stored in the parity buffer 1119 with the parity data stored in the disk 1204, it is determined that the data write unit 1107 could not write the parity data (New Parity) 1208 to the disk 1204 (NO in step S1405). Further, if the consistency determining unit 1108 determines that the parity data (New Parity) 1208 is consistent with the parity data stored in the disk 1204 as a result of comparing the parity data (New Parity) 1208 stored in the parity buffer 1119 with the parity data stored in the disk 1204, it is determined that the data write unit 1107 could write the parity data (New Parity) 1208 to the disk 1204 (YES in step S1405).

If it is determined that the data write unit 1107 could write the data (New Data) 1205 and the parity data (New Parity) 1208 to the disk 1201 and the disk 1204, respectively (YES in step S1405), the buffer deallocating unit 1110 deletes the parity data (New Parity) 1208 stored in the parity buffer 1119 and the data (Old Data) 1206 stored in the data buffer 1118. The CM 1100 normally terminates the data write processing. If it is determined that the data write unit 1107 could not write the parity data (New Parity) 1208 to the disk 1204 (NO in step S1405), the buffer allocating unit 1104 allocates the error buffer 1120 (step S1406) and the buffer deallocating unit 1110 deallocates the data buffer 1118 and the parity buffer 1119.

Then, in the case where the data write unit 1107 newly writes the data (New Data) 1301 to the disk 1202, the stripe check unit 1115 determines whether a stripe where the data (New Data) 1301 is to be written is an error stripe (step S1408).

If the stripe check unit 1115 determines that a stripe where the data (New Data) 1301 is to be written is not an error stripe (NO in step S1408), the CM 1100 normally terminates the control processing for preventing capacity exhaustion of the parity buffer 1119.

If the stripe check unit 1115 determines that a stripe where the data (New Data) 1301 is to be written is an error stripe (YES in step S1408), the parity bit check unit 1116 checks the parity bit 1211 stored in the error buffer 1120 (step S1409).

If the parity bit check unit 1116 determines that the parity bit 1211 is "0" (NO in step S1409), the data write unit 1107 writes the data (New Data) 1301 to the disk 1202 (step S1410).

Figure 22:
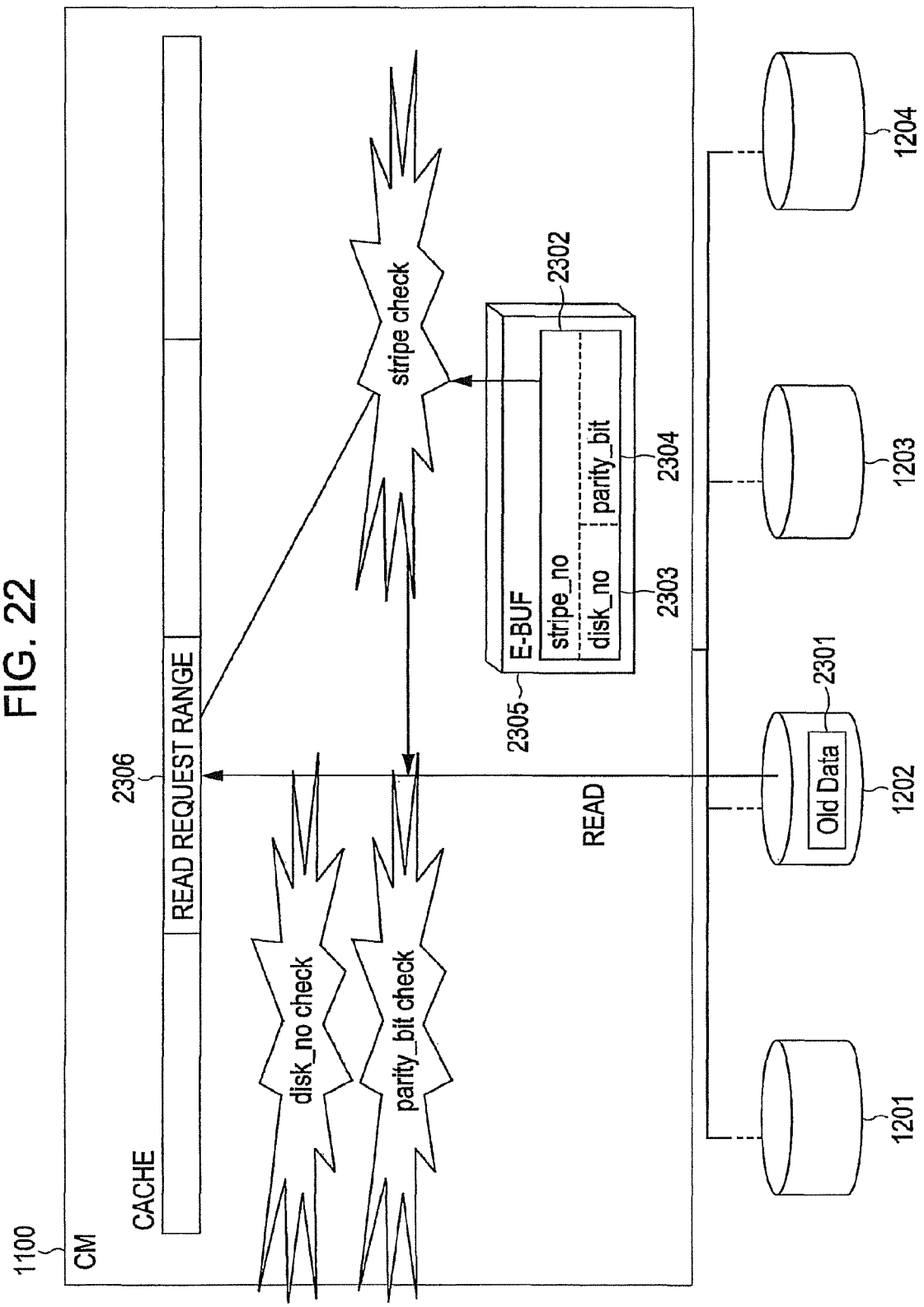
FIG. 22 shows processing for reading data (Old Data) according to the embodiment of the present invention.

If the parity bit check unit 1116 determines that the parity bit 1211 is "1" (YES in step S1409), the CM 1100 executes control to prevent buffer capacity exhaustion as shown in FIG. 22.

Figure 12:
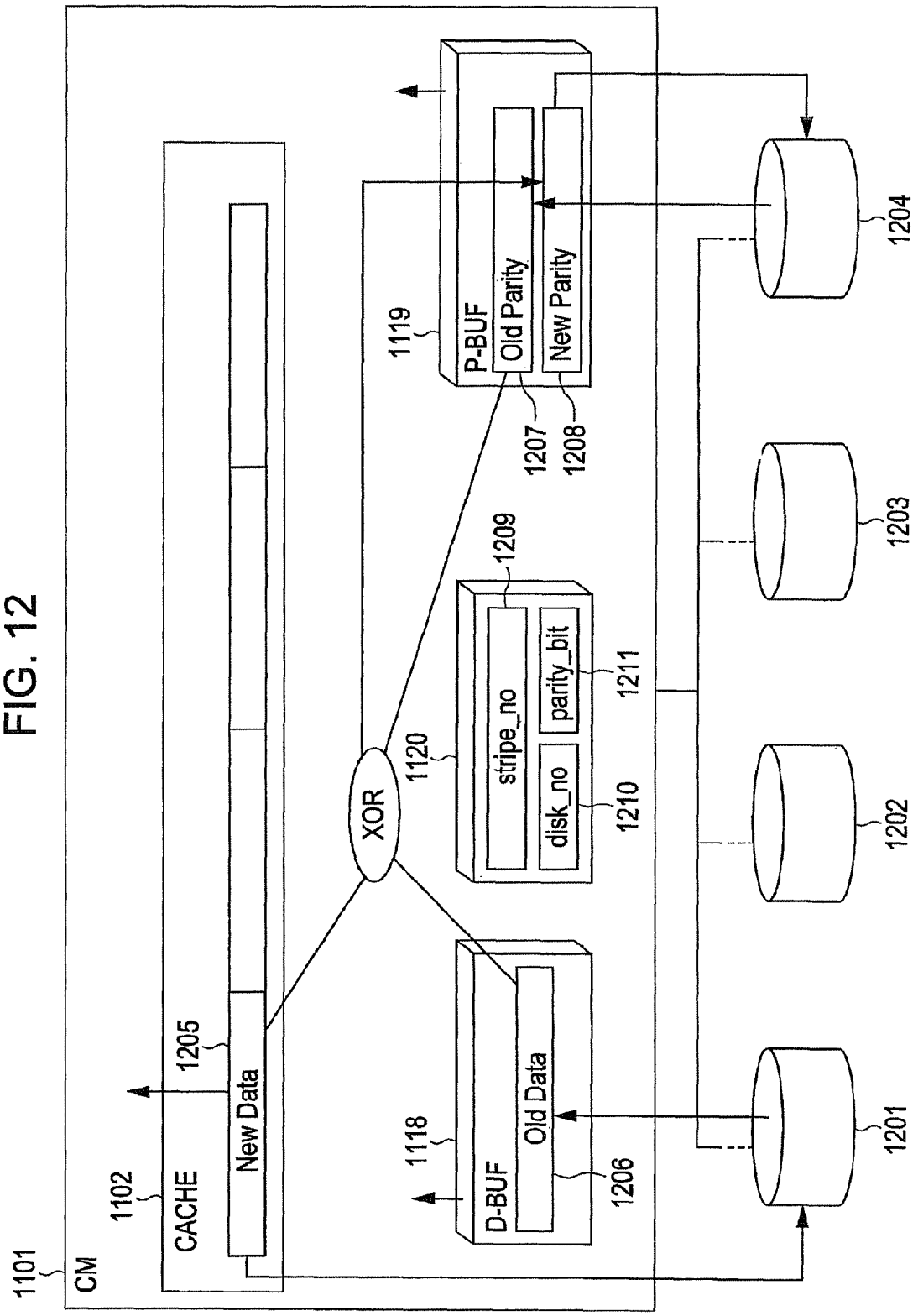
FIG. 12 is a schematic diagram of control processing for preventing capacity exhaustion of a parity buffer according to the embodiment of the present invention.
Figure 13:
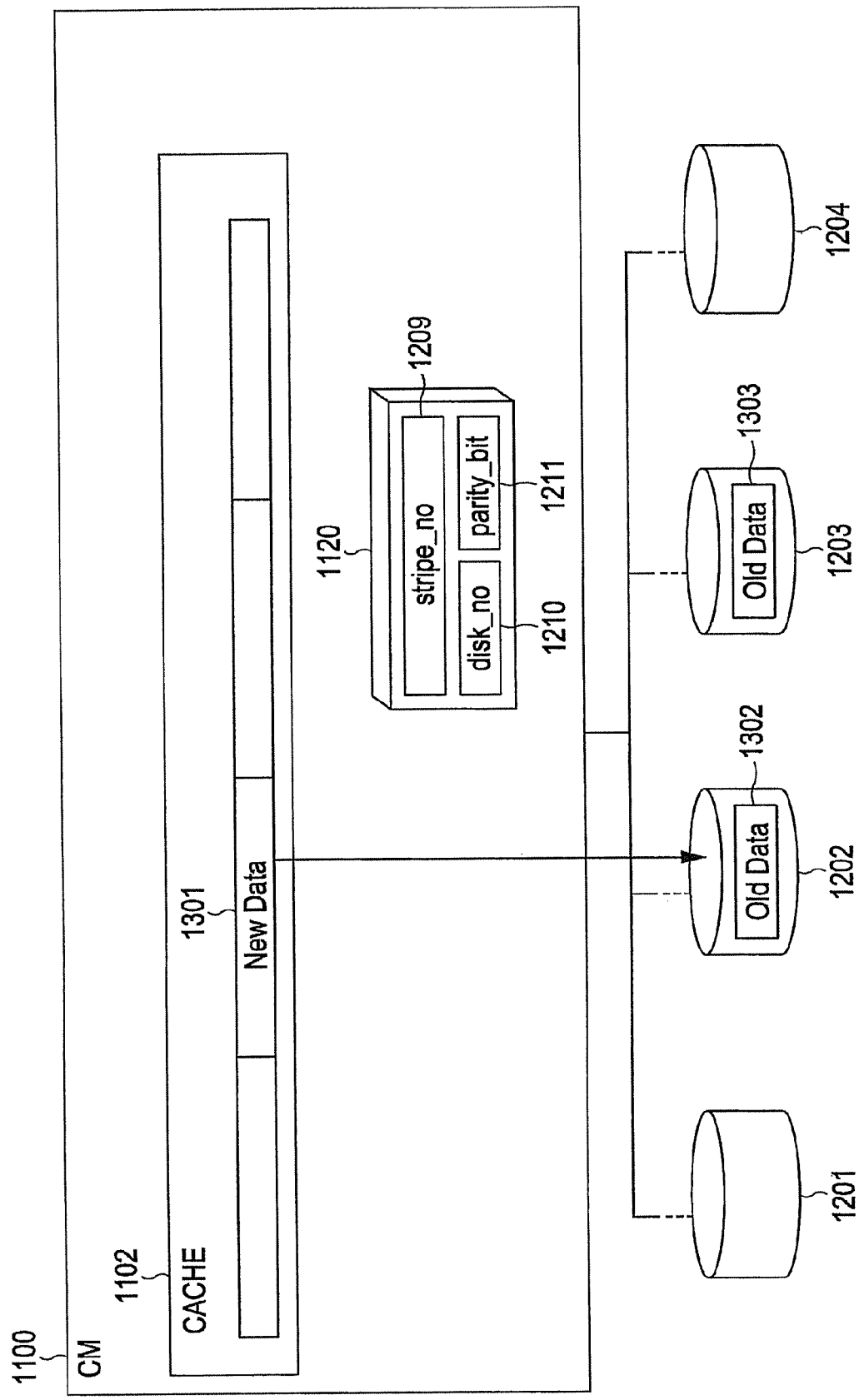
FIG. 13 is a schematic diagram of control processing for preventing capacity exhaustion of a parity buffer according to the embodiment of the present invention.

The control processing for preventing exhaustion of a buffer capacity in the flowchart of FIG. 14 is illustrated in FIGS. 12 and 13. FIG. 12 shows processing for deallocating the parity buffer 1119 in the CM 1100. FIG. 13 shows processing for writing the data (New Data) 1301 to the disk 1202 with the CM 1100.

Figure 15:
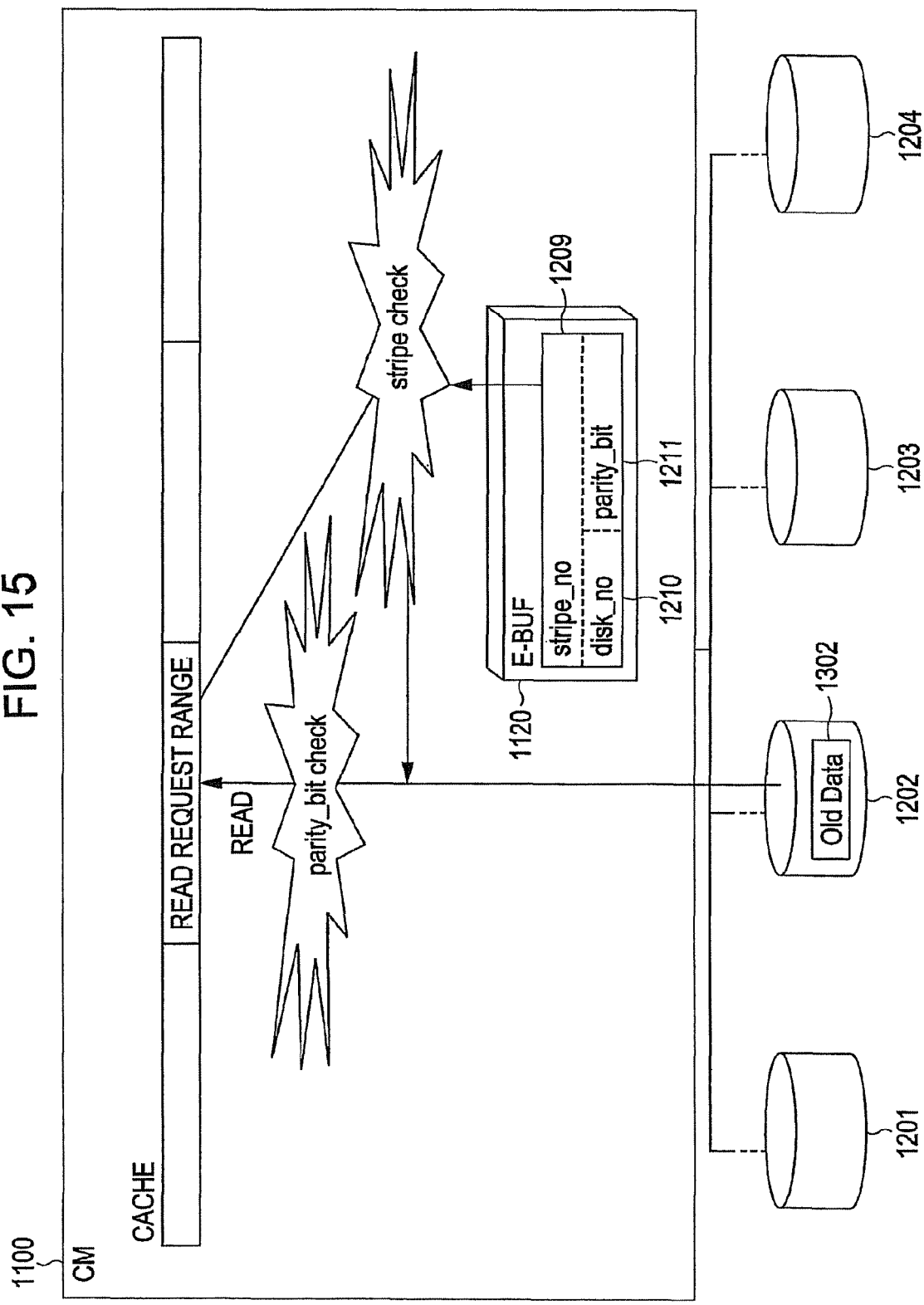
FIG. 15 shows processing for reading data from a disk with a CM according to the embodiment of the present invention.

FIG. 15 shows processing for reading data from the disk 1202 with the CM 1100.

If a host computer issues a read command in the case where the data write unit 1107 failed to write the parity data (New Parity) 1208 to the disk 1204, the stripe check unit 1115 compares a stripe number of data as a target for the read command with the stripe number 1209 stored in the error buffer 1120. Then, the stripe numbers match with each other, the parity bit check unit 1116 checks the parity bit 1211 in the error buffer 1120. If the parity bit is "0", the data write-back unit 1109 reads the data as a target for the read command to the cache 1102.

[7. Flowchart of Rebuild Processing]

Figure 18:
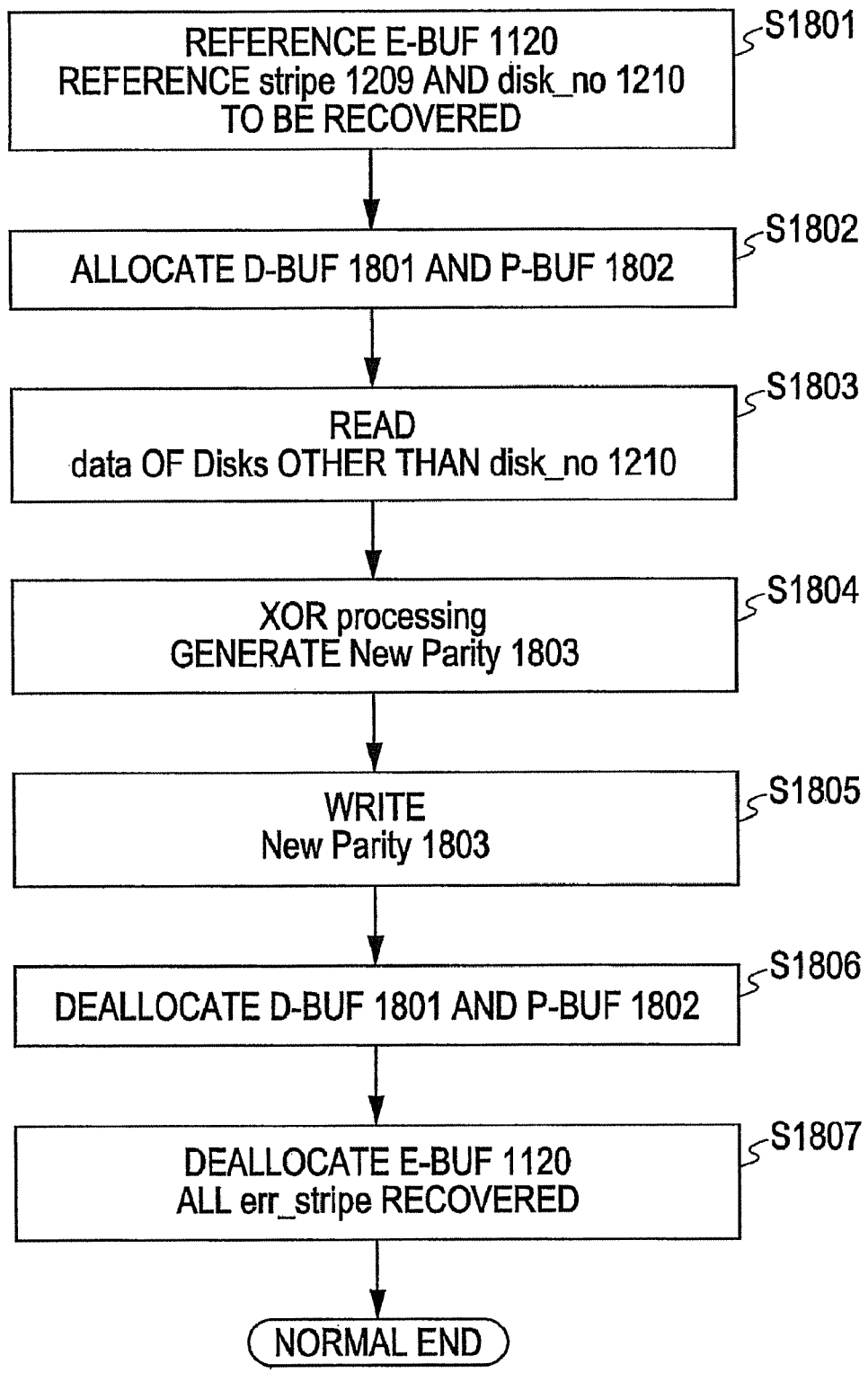
FIG. 18 is a flowchart of rebuild processing according to the embodiment of the present invention.

FIG. 18 is a flowchart of rebuild processing of this embodiment.

In the case where the CM 1100 performs rebuild processing, the RAID recovery unit 1112 requests the RAID control unit 1111 to execute rebuild processing.

The RAID control unit 1111 references the stripe number 1209 and the disk number 1210 in the error buffer 1120 (step S1801). This is to determine a stripe and a disk where data could not be written with the CM 1100.

The buffer allocating unit 1104 allocates a data buffer 1801 and a parity buffer 1802 on the buffer 1103 (step S1802).

Figure 17:
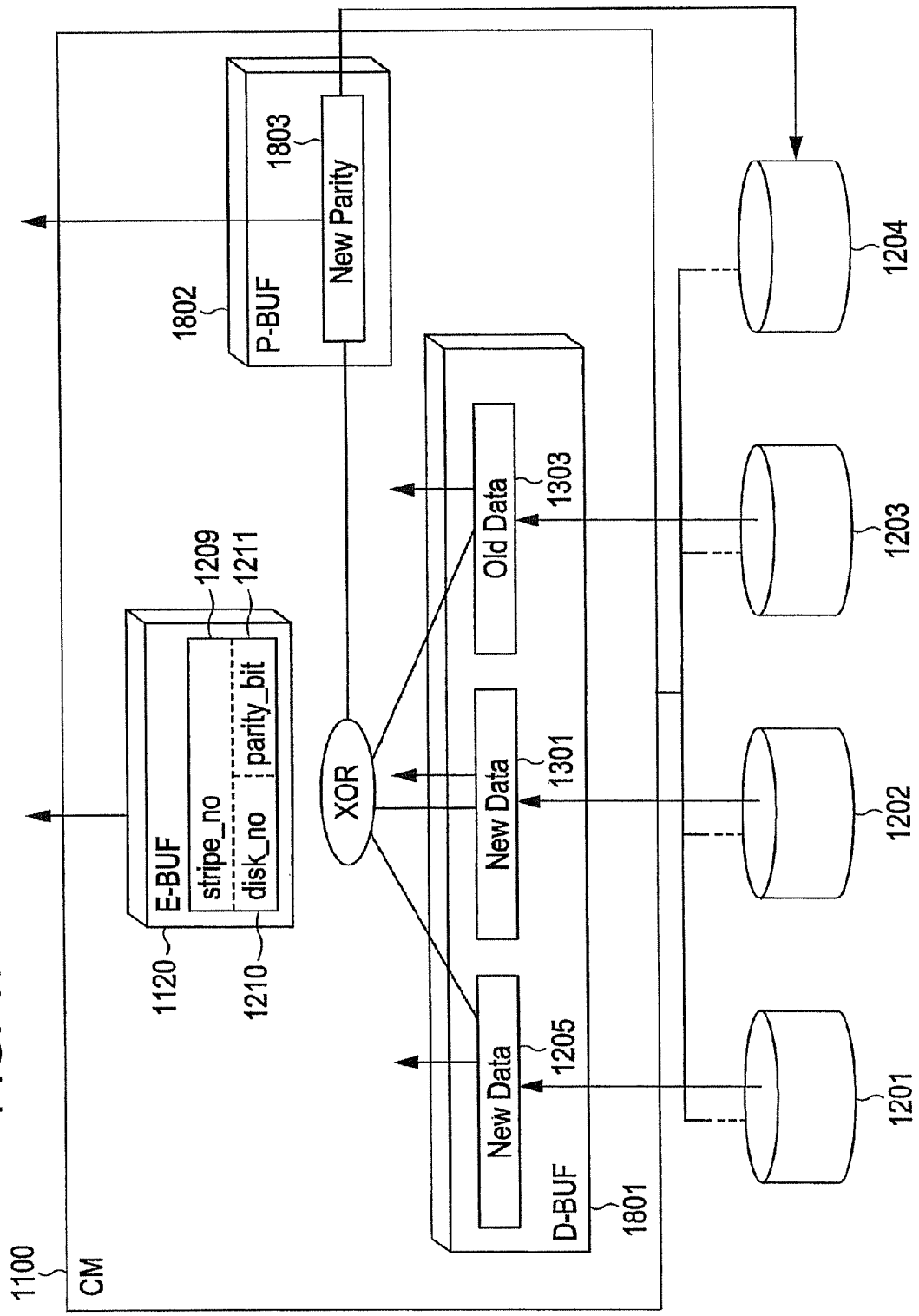
FIG. 17 is a schematic diagram illustrating rebuild processing according to the embodiment of the present invention.

The data write-back unit 1109 reads data in disks other than the disk specified by the disk number 1210 from the data buffer 1801 and the parity buffer 1802 (step S1803). In this embodiment, the data write unit 1107 failed to write the parity data (New Parity) 1208 to the disk 1204. Thus, as shown in FIG. 17, the data write-back unit 1109 writes back the data (New Data) 1205 from the disk 1201, the data (New Data) 1301 from the disk 1202, and the data (Old Data) 1303 from the disk 1203 to the data buffer 1801.

The parity generating unit 1106 performs exclusive OR of the data (New Data) 1205, the data (New Data) 1301, and the data (Old Data) 1303 to generate the parity data (New Parity) 1803 and store the parity data (New Parity) 1803 in the parity buffer 1802 (step S1804).

The data write unit 1107 writes the parity data (New Parity) 1803 to the disk 1204 (step S1805).

The buffer deallocating unit 1110 deallocates the data buffer 1801 and the parity buffer 1802 (step S1806).

Further, the buffer deallocating unit 1110 deallocates the error buffer 1120 (step S1807), and the CM 1100 terminates the rebuild processing.

Figure 16:
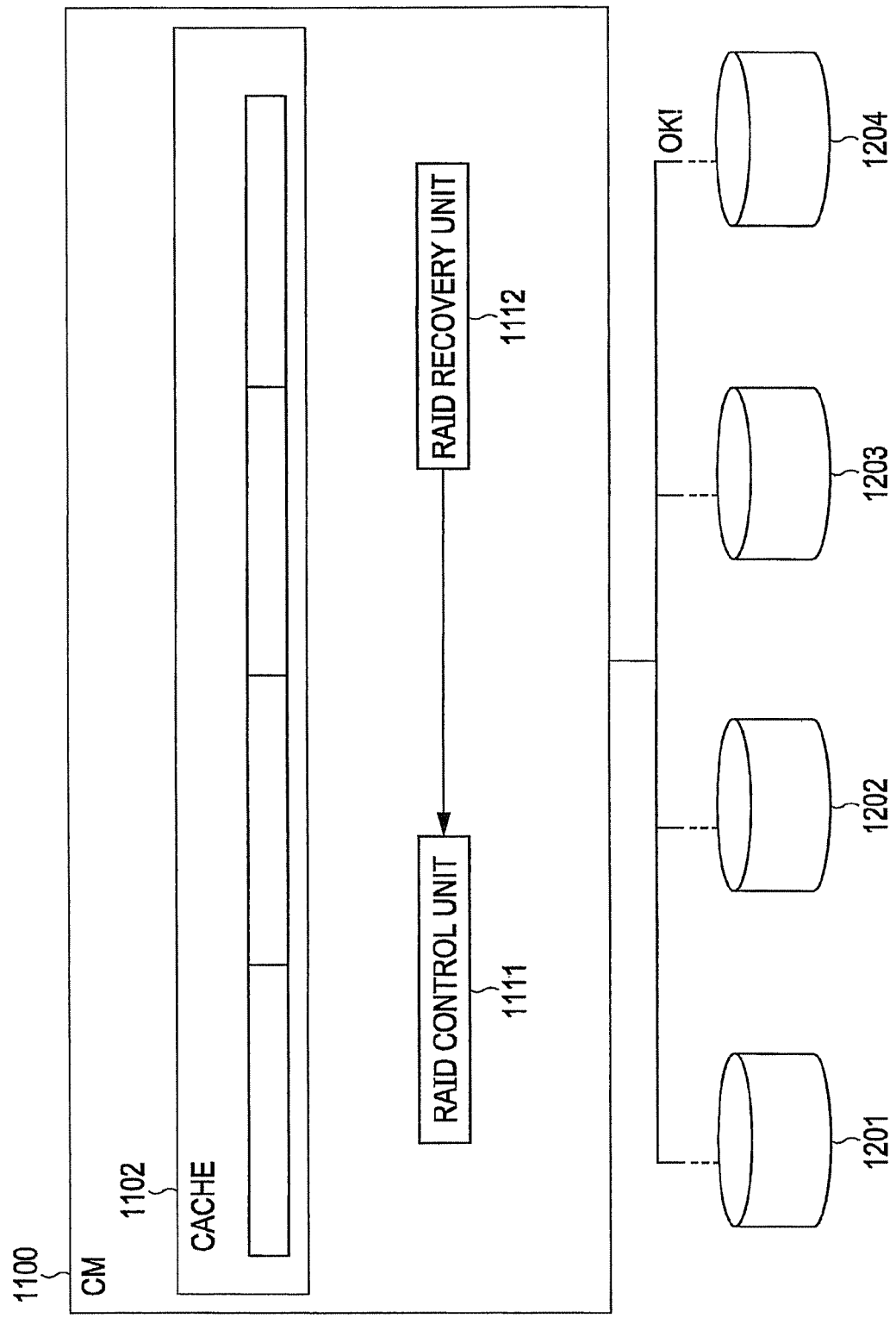
FIG. 16 is a schematic diagram illustrating rebuild processing according to the embodiment of the present invention.

The rebuild processing in the flowchart of FIG. 18 is illustrated in FIGS. 16 and 17. FIG. 16 shows how the RAID recovery unit 1112 requests the RAID control unit 1111 to execute the rebuild processing. FIG. 17 shows processing for deallocating the error buffer 1120.

[8. Flowchart of Control Processing for Preventing Capacity Exhaustion of Data Buffer 1118]

Figure 21:
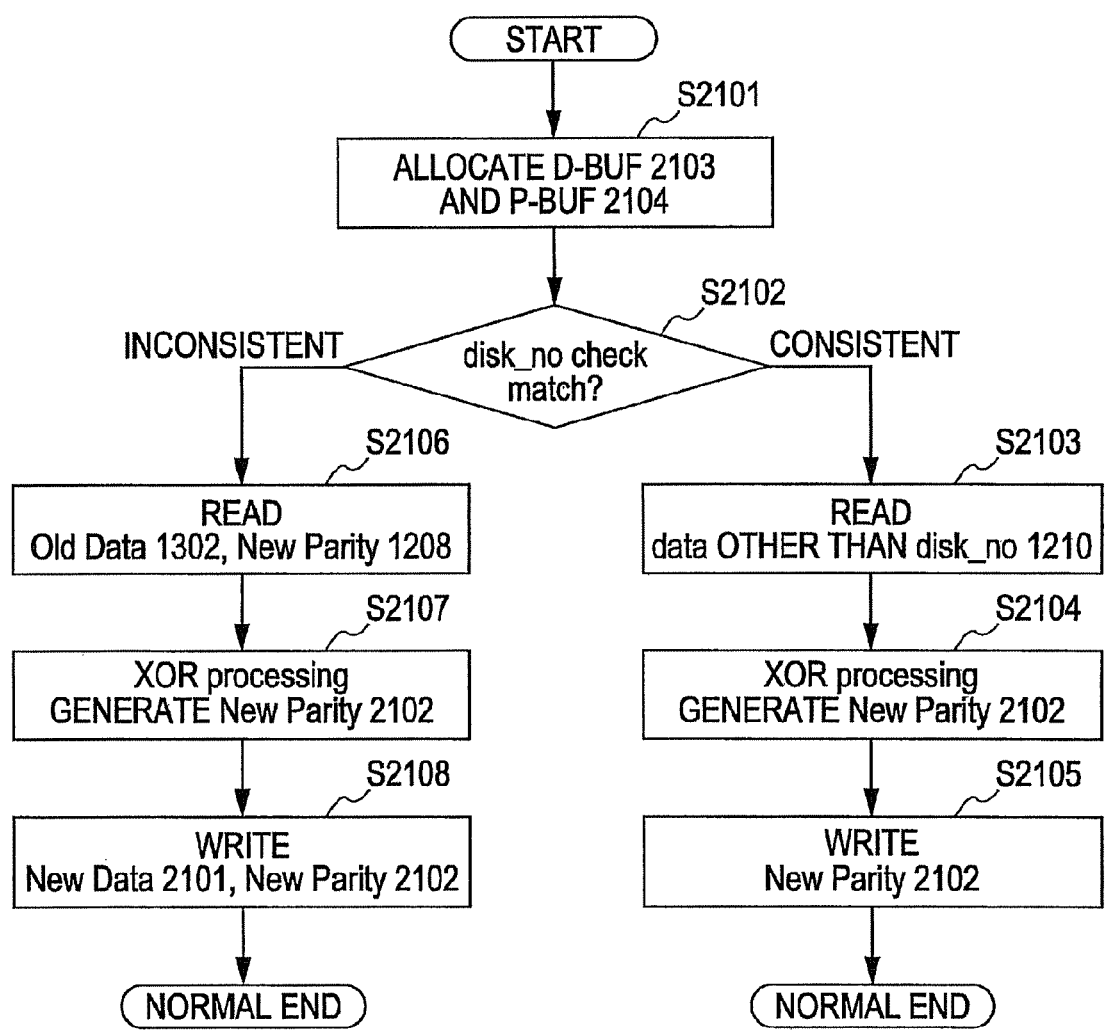
FIG. 21 is a flowchart of control processing for preventing capacity exhaustion of a data buffer according to the embodiment of the present invention.

FIG. 21 is a flowchart of control processing for preventing capacity exhaustion of the data buffer 1118 in this embodiment.

If the CM 1100 failed to write the data (New Data) 1205 to the disk 1201 and successfully wrote the parity data (New Parity) 1208, the CM 1100 executes the processing in the flowchart of FIG. 21.

Figure 19:
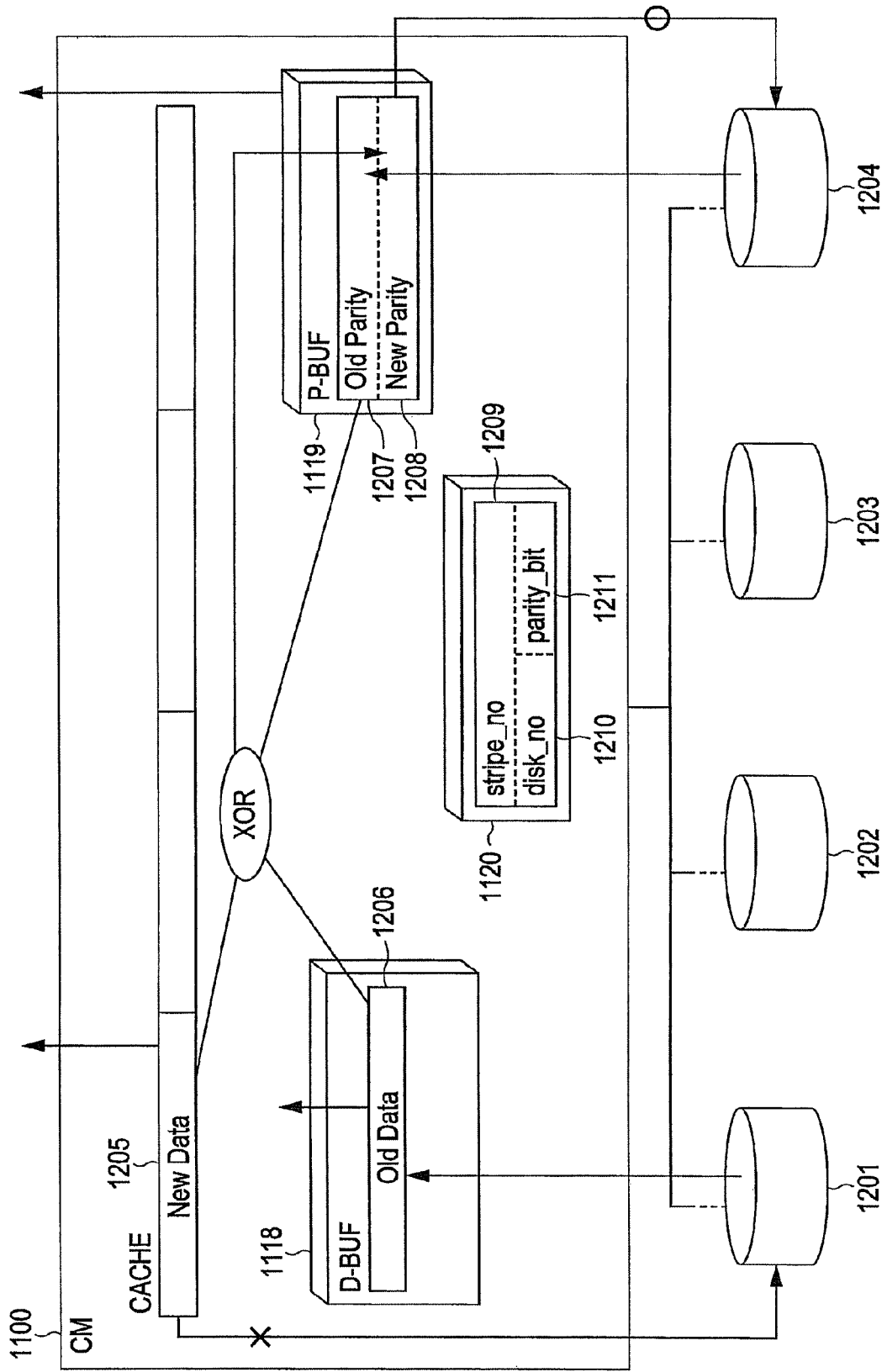
FIG. 19 shows processing for deallocating a data buffer with a CM according to the embodiment of the present invention.

FIG. 19 shows the case where the CM 1100 failed to write the data (New Data) 1205 to the disk 1201 and successfully wrote the parity data (New Parity) 1208.

In response to a small write (Small Write) data write command from the host computer, the buffer allocating unit 1104 allocates the data buffer 1118 and parity buffer 1119 where the data (Old Data) 1206 and the data (Old Parity) 1207 are to be read, on the memory 1103.

The data read unit 1105 reads the data (Old Data) 1206 and the data (Old Parity) 1207 to the data buffer 1118 and the parity buffer 1119, respectively. The data buffer 1118 stores the data (Old Data) 1206, and the parity buffer 1119 stores the data (Old Parity) 1207.

The parity generating unit 1106 performs exclusive OR (XOR) of the data (Old Data) 1206 and the parity data (Old Parity) 1207 and performs exclusive OR (XOR) of an intermediate result and the data (New Data) 1205 stored in the cache 1102 to generate the parity data (New Parity) 1208.

The data write unit 1107 tries to write the data (New Data) 1205 and the parity data (New Parity) 1208 to the disk 1201 and the disk 1204, respectively (step S1404). If the consistency determining unit 1108 determines that the data (New Data) 1206 could not be written to the disk 1201, the buffer allocating unit 1104 allocates the error buffer 1120 and stores a stripe number 2001, a disk number 2002, and a parity bit 2003 concerning a write error in the error buffer. The buffer deallocating unit 1110 deallocates the data buffer 1118 and the parity buffer 1119.

Then, the CM 1100 executes the processing flow in FIG. 21. The CM 1100 performs processing for writing data (New Data) 2101 as a target for a write command issued from the host computer, to the disk 1202.

If the parity bit check unit 1116 determines that the parity bit 1211 is "1" (YES in step S1409), the CM 1100 executes control to prevent exhaustion of a buffer capacity as shown in FIG. 22.

First, the buffer allocating unit 1104 allocates a data buffer 2103 and a parity buffer 2104 on the memory 1103 (step S2101).

The error search unit 1117 compares a disk number of the data (New Data) 2101 with the disk number 1210 stored in the error buffer 1120 (step S2102). The error search unit 1117 determines whether the disk number of the data (New Data) 2101 matches the disk number 1210.

If the error search unit 1117 determines that the disk number of the data (New Data) 2101 matches the disk number 1210 (YES in step S2102), the data write-back unit 1109 reads data and parity data in disks other than the disk specified by the disk number 1210 from the data buffer 2103 and the parity buffer 2104 (step S2103). The parity generating unit 1106 performs exclusive OR of the read data and the data (New Data) 2101 to generate parity data (New Parity) 2102 (step S2104). The data write unit 1107 writes the parity data (New Parity) 2102 to the disk 1204 (step S2105).

If the error search unit 1117 determines that the disk number of the data (New Data) 2101 does not match the disk number 1210 (NO in step S2102), the data write-back unit 1109 reads the data (Old Data) 1303 from the disk 1203 to the data buffer 2103. Moreover, the data write-back unit 1109 reads the parity data (New Parity) 1208 from the disk 1204 to the parity buffer 2104 (step S2106). The parity generating unit 1106 performs exclusive OR of the data (New Data) 2101, the data (Old Data) 1303, and the parity data (New Parity) 1208 to generate the parity data (New Parity) 2102 (step S2107). Then, the data write unit 1107 writes the data (New Data) 2101 to the disk 1202 and writes the parity data (New Parity) 2102 to the disk 1204 (step S2108).

Figure 20:
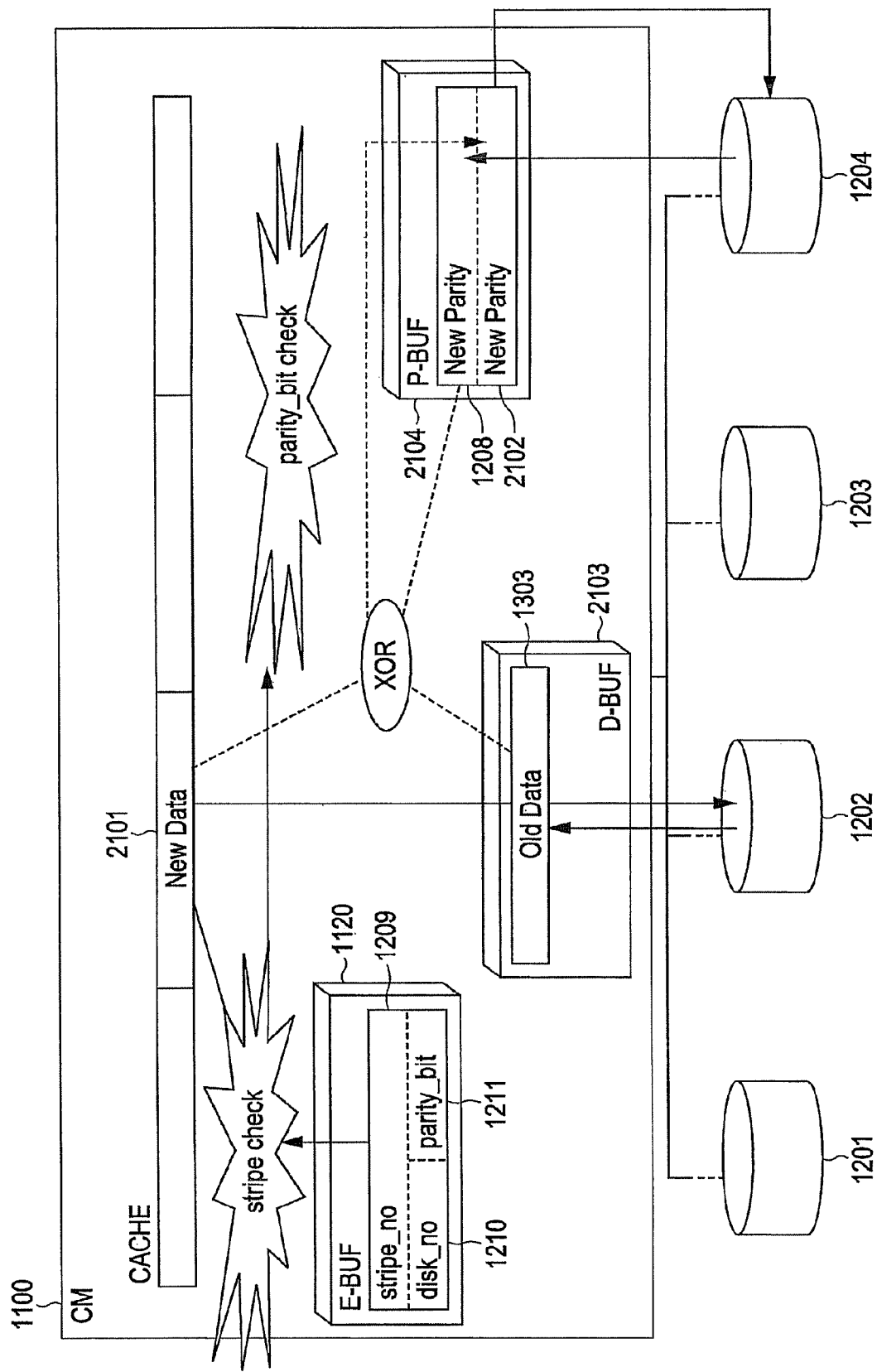
FIG. 20 is a flowchart of control processing for preventing capacity exhaustion of a data buffer according to the embodiment of the present invention.

The control processing for preventing exhaustion of a buffer capacity in the flowchart of FIG. 21 is illustrated in FIGS. 19 and 20. FIG. 19 shows processing for deallocating the data buffer 1118 in the CM 1100. FIG. 20 shows processing for writing the data (New Data) 2101 to the disk 1202 with the CM 1100.

[9. Flowchart of Control Processing for Preventing Capacity Exhaustion of Data Buffer 1118]

FIG. 23 is a flowchart of processing for reading the data (Old Data) 1302 stored in the disk 1202 in this embodiment.

The flowchart of FIG. 23 shows processing executed with the CM 1100 in the case where the host computer issues a command to read data from a stripe to which data could not be written.

The stripe check unit 1115 checks a stripe number indicating a stripe where the data (Old Data) 2301 read with the data write-back unit 1109 belongs (step S2301). The stripe check unit 1115 compares a stripe number indicating a stripe where the data (Old Data) 2301 belongs with the stripe number 2302 stored in an error buffer 2305 and determines whether the two numbers match each other.

If the stripe check unit 1115 determines that a stripe number indicating a stripe where the data (Old Data) 2301 belongs does not match the stripe number 2302 (NO in step S2301), the CM 1100 normally terminates the data read processing. If the stripe check unit 1115 determines that a stripe number indicating a stripe where the data (Old Data) 2301 belongs matches the stripe number 2302 (YES in step S2301), the parity bit check unit 1116 checks a parity bit 2304 stored in the error buffer 2305 (step S2302). If the parity bit check unit 1116 determines that the parity bit 2304 is "0" (NO in step S2302), the data write-back unit 1109 reads the data (Old Data) 2301 to the cache 1102 and normally terminates the read processing (step S2303). If the parity bit check unit 1116 determines that the parity bit 2304 is "1" (YES in step S2302), the error search unit 1117 checks a disk number of a disk where the data (Old Data) 2301 is stored (step S2304). The error search unit 1117 determines whether a disk number of a disk where the data (Old Data) 2301 is stored matches with a disk number 2303 stored in the error buffer 2305.

If the error search unit 1117 determines that a disk number of a disk where the data (Old Data) 2301 is stored does not match the disk number 2303 stored in the error buffer 2305 (NO in step S2304), the data write-back unit 1109 writes back the data (Old Data) 2301 to the cache 1102 (step S2305). If the error search unit 1117 determines that a disk number of a disk where the data (Old Data) 2301 is stored matches the disk number 2303 stored in the error buffer 2305 (YES in step S2304), the buffer allocating unit 1104 allocates a data buffer and a parity buffer (step S2306). The data write-back unit 1109 writes back data from disks other than the disk specified by the disk number 2303 to the data buffer and the parity buffer (step S2307). For example, as shown in FIG. 22, since the disk number 2301 indicates the disk 1202, the data write-back unit 1109 reads data and parity data from the disks 1201, 1203, and 1204 to the data buffer and the parity buffer.

Then, the parity generating unit 1106 performs exclusive OR of the data and parity data read to the data buffer and the parity buffer to generate data (New Data) 2306 (step S2308). The processing for reading the data (Old Data) 1302 in the flowchart of FIG. 23 is illustrated in FIG. 22.

All examples and conditional language recited herein are intended for pedagogical purposes to aid the reader in understanding the invention and the concepts contributed by the inventor to furthering the art, and are to be construed as being without limitation to such specifically recited examples and condition, nor does the organization of such examples in the specification relate to a showing of superiority and inferiority of the invention. Although the embodiment of the present inventions have been described in detail, it should be understood that the various changes, substitutions, and alternations could be made hereto without departing from the spirit and scope of the invention.

What is claimed is:

1. A control method for controlling a controller connected to a plurality of storage units storing data, the controller including a cache and a buffer, the method comprising:
    storing data in the cache;
    generating parity data corresponding to the data stored in the cache and storing the parity data in the buffer;
    writing the data stored in the cache and the parity data stored in the buffer into the plurality of the storage units;
    reading the data and the parity data from the plurality of storage units;
    checking error over the read out data by using the read out parity data;
    storing, if an error is detected in the read out data and the read out parity data, data for reading a plurality of data constituting a stripe in each of the plurality of storage units in the buffer,
    regenerating parity data by using the plurality of data readout from the storage units; and
    overwriting the plurality of data and the parity data into the plurality of the storage units.

2. The control method according to claim 1, wherein the reading step reads the data and the parity data which constitutes a stripe in the plurality of storage units with the read out data.

3. The control method according to claim 1, the control method further comprising:
    when an error is detected in the read out data and the read out parity data, generating a reading information indicative of reading out data other than the error detected parity data so as to regenerating the parity data.

4. An apparatus comprising:
    a plurality of storage units for storing data;
    a cache for storing data;
    a buffer for storing parity data corresponding to the data; and
    a controller for writing the data and the parity data into the plurality of the storage units in accordance with a process comprising:
    generating parity data corresponding to the data stored in the cache and storing the parity data in the buffer;
    writing the data stored in the cache and the parity data stored in the buffer into the plurality of the storage units;
    reading the data and the parity data from the plurality of storage units;
    checking error over the read out data by using the read out parity data;
    storing, if an error is detected in the read out data and the read out parity data, data for reading a plurality of data constituting a stripe in each of the plurality of storage units in the buffer,
    regenerating parity data by using the plurality of data readout from the storage units; and
    overwriting the plurality of data and the parity data into the plurality of the storage units.

* * * * *